US011332352B2

(12) United States Patent
Bowers et al.

(10) Patent No.: US 11,332,352 B2
(45) Date of Patent: May 17, 2022

(54) AUTONOMOUS LIFT SYSTEM

(71) Applicant: Ample Inc., San Francisco, CA (US)

(72) Inventors: Kenji Terata Bowers, San Francisco, CA (US); Thomas Ly, San Francisco, CA (US); Khaled Walid Hassounah, San Francisco, CA (US); Ankit Srivastava, San Francisco, CA (US)

(73) Assignee: Ample, Inc., San Francisco, CA (US)

( * ) Notice: Subject to any disclaimer, the term of this patent is extended or adjusted under 35 U.S.C. 154(b) by 353 days.

(21) Appl. No.: 16/451,156

(22) Filed: Jun. 25, 2019

(65) Prior Publication Data

US 2020/0407206 A1 Dec. 31, 2020

(51) Int. Cl.
*B66F 9/06* (2006.01)
*B66F 7/28* (2006.01)
*B66F 3/46* (2006.01)
*B66F 7/20* (2006.01)
*B25J 9/16* (2006.01)

(52) U.S. Cl.
CPC .............. *B66F 9/063* (2013.01); *B25J 9/162* (2013.01); *B66F 3/46* (2013.01); *B66F 7/20* (2013.01); *B66F 7/28* (2013.01); *B66F 2700/123* (2013.01)

(58) Field of Classification Search
CPC ...... B66F 3/22; B66F 3/46; B66F 5/00; B66F 5/04; B66F 7/065; B66F 7/16; B66F 7/20; B66F 7/246; B66F 7/28
See application file for complete search history.

(56) References Cited

U.S. PATENT DOCUMENTS

| 3,378,231 | A | * | 4/1968 | Rapp | B66F 7/065 |
|---|---|---|---|---|---|
| | | | | | 254/93 R |
| 2011/0130865 | A1 | * | 6/2011 | Setzer, Sr. | B66F 17/003 |
| | | | | | 700/213 |
| 2016/0185580 | A1 | | 6/2016 | Luinge | |
| 2017/0088406 | A1 | | 3/2017 | Jaipaul et al. | |
| 2018/0118538 | A1 | | 5/2018 | Latvys | |
| 2018/0237278 | A1 | | 8/2018 | Jaipaul et al. | |
| 2018/0339890 | A1 | * | 11/2018 | Perlstein | G05D 1/0297 |
| 2018/0354760 | A1 | | 12/2018 | Elliott et al. | |

OTHER PUBLICATIONS

ISA, "International Search Report", PCT/US2019/038921, dated Sep. 13, 2019.

* cited by examiner

*Primary Examiner* — Tyrone V Hall, Jr.
(74) *Attorney, Agent, or Firm* — Intrinsic Law Corp.

(57) ABSTRACT

A lift for raising or moving loads is disclosed. The lift is autonomous and comprises several parts for sensing and communicating as well as actuating a displacement. In some instances, the lift is moveable and includes optical and other sensors and can furthermore determine one or more vehicle wheel locations to position itself and raise a vehicle up off of the ground.

24 Claims, 22 Drawing Sheets

AUTONOMOUS LIFT SYSTEM

TECHNICAL FIELD

Figure 1:
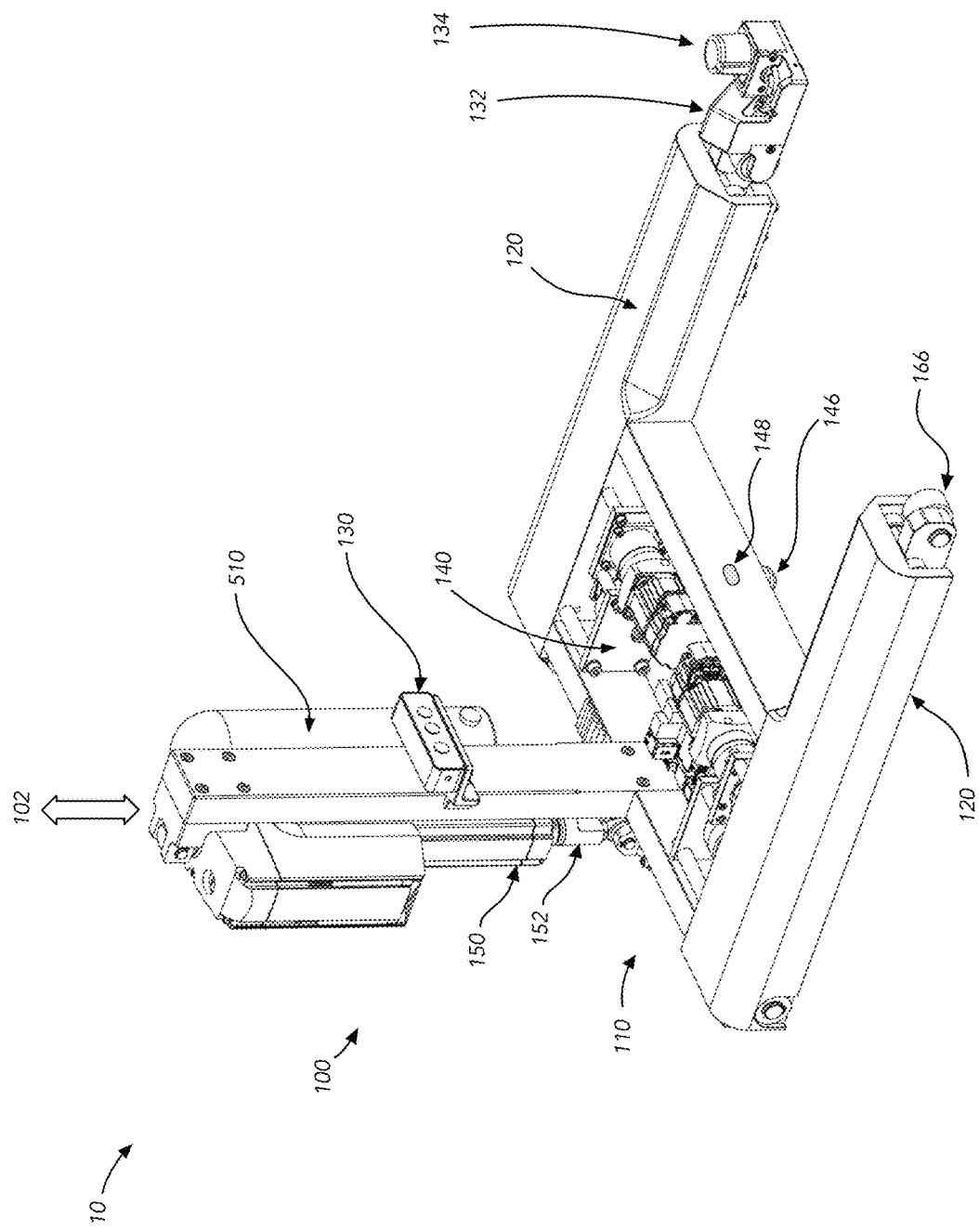

The present application relates to raising or moving objects, for example, for raising motor vehicles using a lift system.

BACKGROUND

Numerous systems are used for raising heavy objects. Sometimes the objects are too heavy to lift by hand, or a required dexterity is needed, or a safety factor requires machines to perform such lifting. A common example is in lifting motor vehicles for service where a lift system is employed to raise the vehicle a desired distance above the ground. Hand operated cranks, hydraulic jacks and commercial shop lifts are typically used for such a purpose.

One drawback of common jacks is that they are slow to set up and operate. Another limitation of most jacking systems is that they only raise one jacking point on a vehicle, e.g., to change an affected flat tire or similar service. Yet another limitation of some systems is that they are unstable and unsafe for frequent use and subject vehicle owners or service personnel to the danger of the heavy vehicle shifting or falling down causing injury and property damage. Still another limitation of whole-car lifting systems is that they generally span a substantial area beneath the vehicle and interfere with or block passage and access to the underside of the vehicle. And furthermore, most commercial lifting systems are inflexible, non-moveable, cumbersome and costly to install and maintain, requiring permanent engineered foundations in a service facility floor.

This disclosure describes and claims a compact and effective multi-point lift system, which can be used in a variety of applications including but not limited to lifting vehicles.

SUMMARY

One or more aspects or embodiments are directed to an autonomous lift system (10) capable of detecting a target load (20), moving with respect to the target load, and applying a force to displace the target load, comprising a support stage (110); a lift stage (100), defining a lift axis (102), secured to and supported by a support stage; one or more load bearing arms (120) translatable along an axis parallel to said lift axis; one or more optical sensors (130) that optically sense an environment of said lift system including said target load; a locomotion system (140) comprising at least one motor and drivetrain assembly that move and position said lift system; and a processor (370) that receives an input from said optical sensors and provides a corresponding output to control said locomotion system to position the lift system and load bearing arms with respect to the target load.

Other aspects or embodiments are directed to a method for autonomously operating a lift, comprising detecting a target load including optically sensing one or more features of said target load using an optical sensor on said lift; processing information derived from detecting said target load in a processor, and generating lift movement information for controlling locomotion of said lift with respect to the target load; moving said lift with respect to the detected target load including driving a locomotion system of said lift with respect to the target load using an on-board motor and drivetrain assembly in said lift; and applying a force to displace the target load including applying a force to translate one or more load bearing arms of said lift against the target load.

IN THE DRAWINGS

Figure 2:
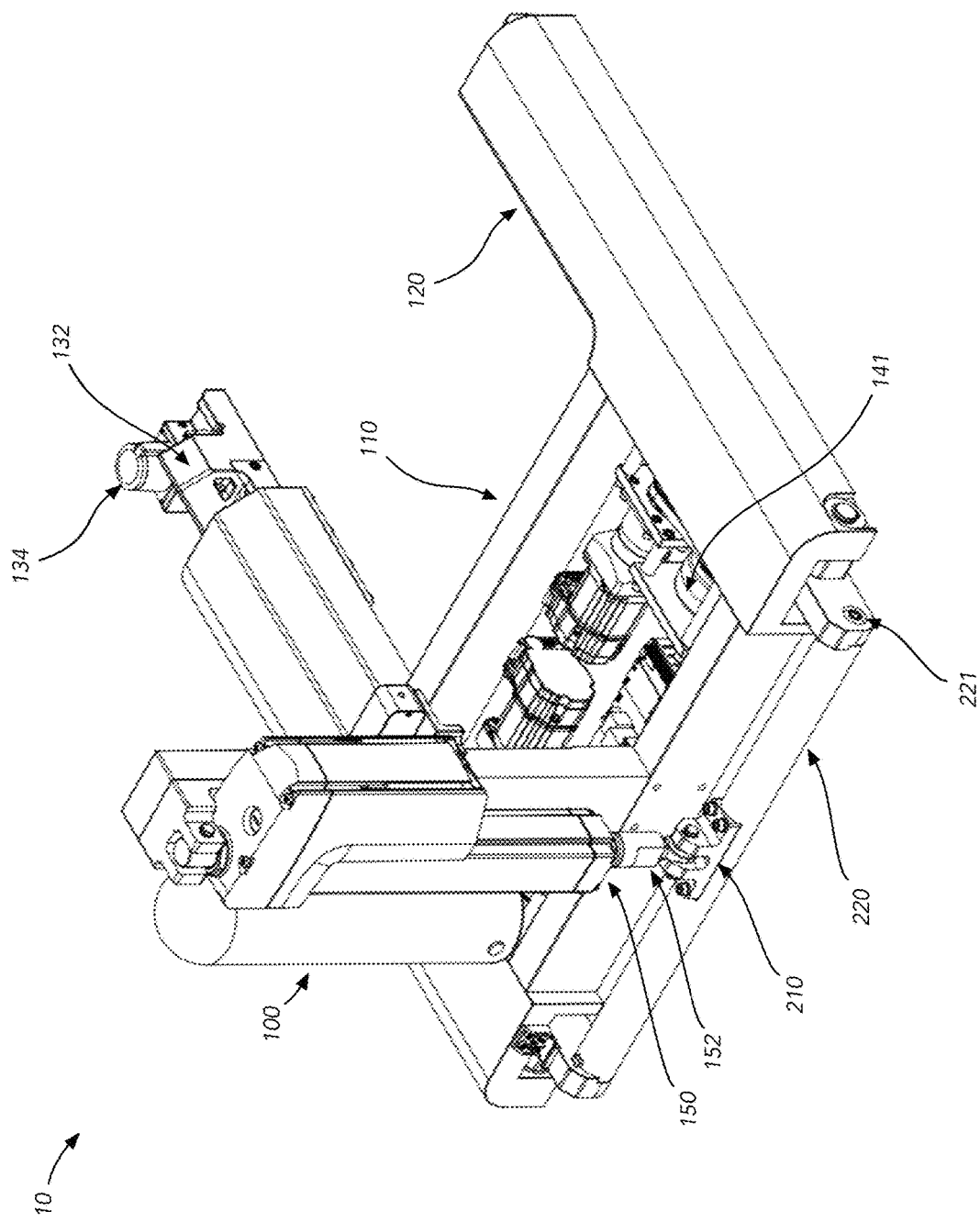
Figure 3:
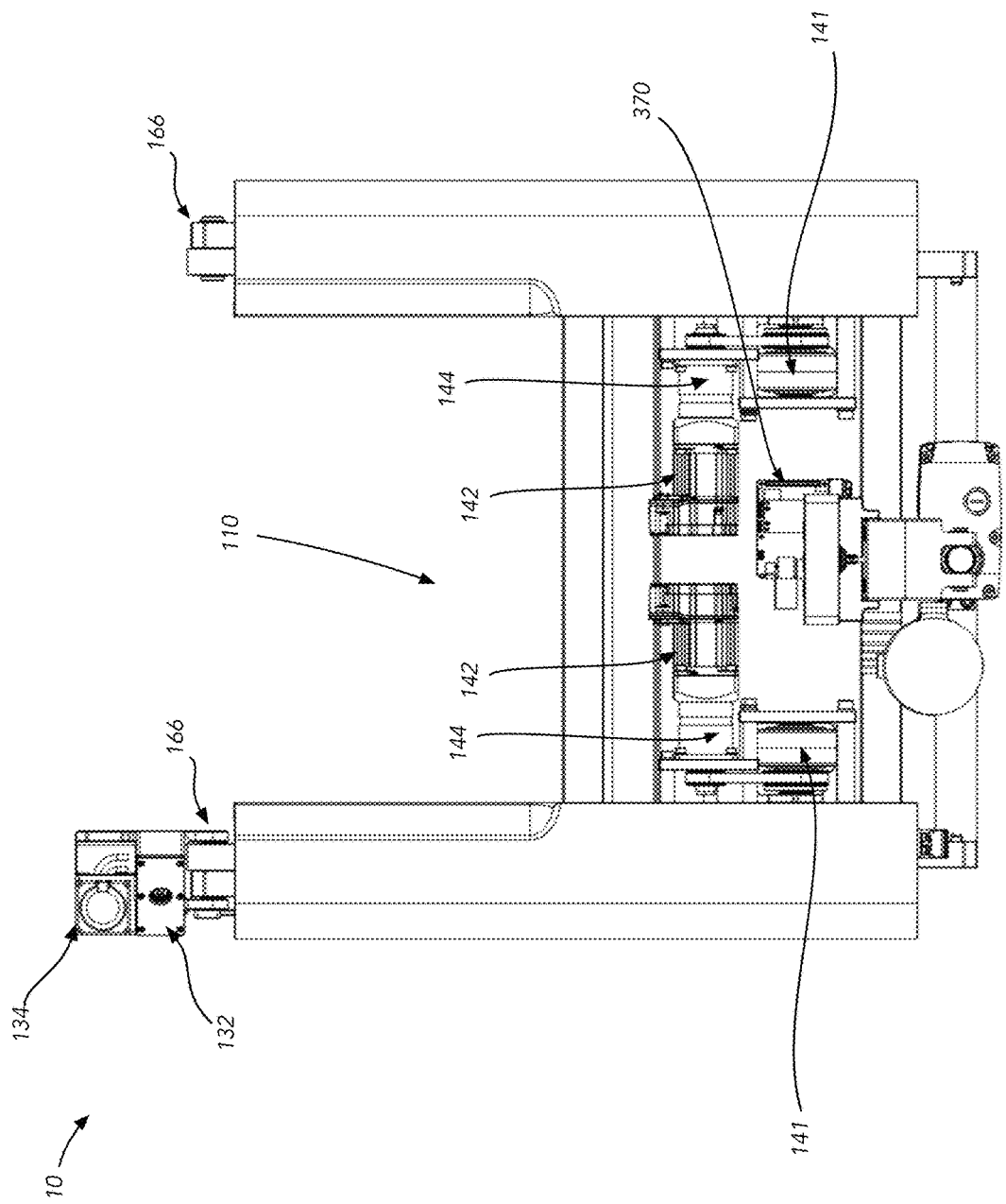
Figure 4:
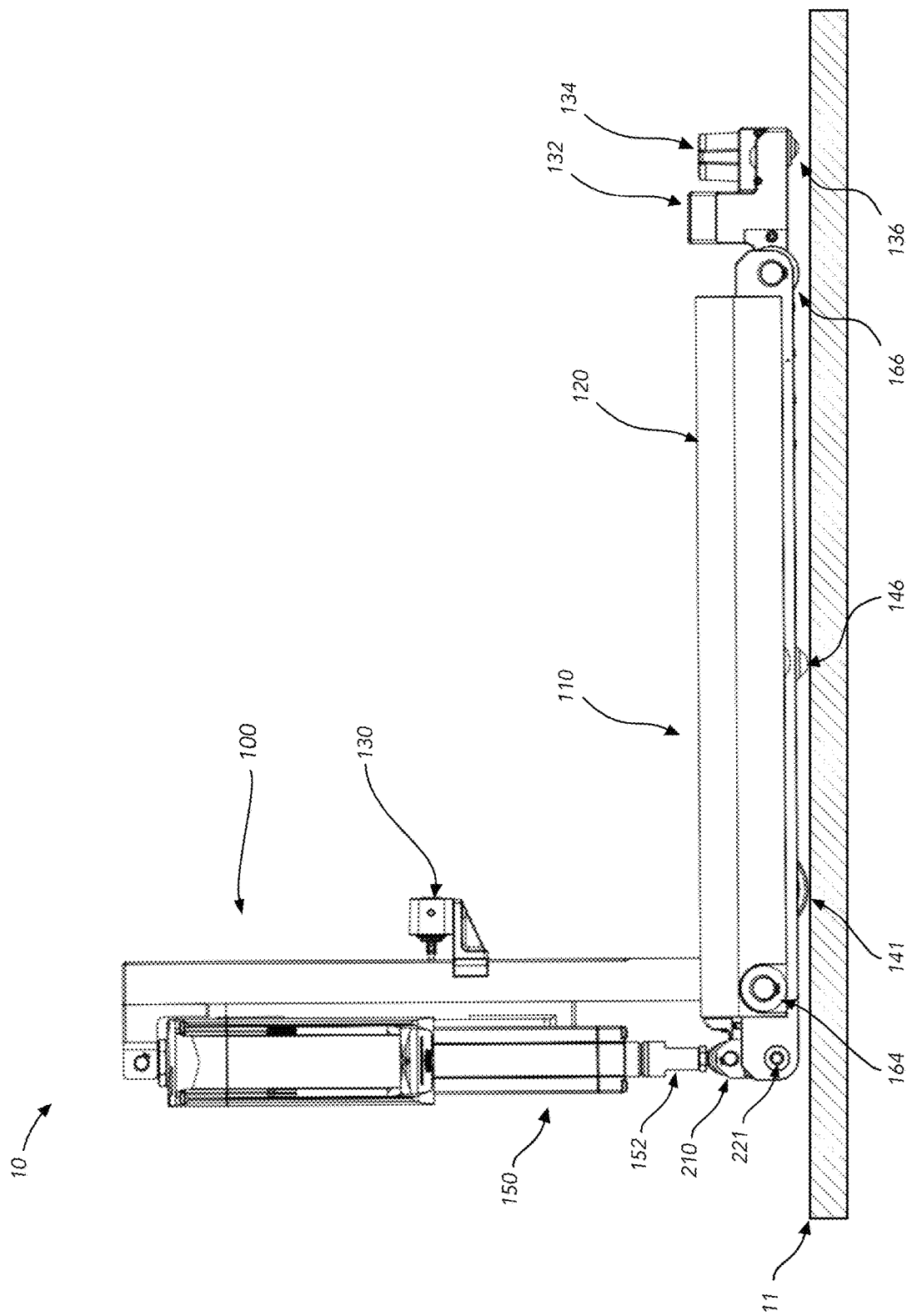
Figure 5:
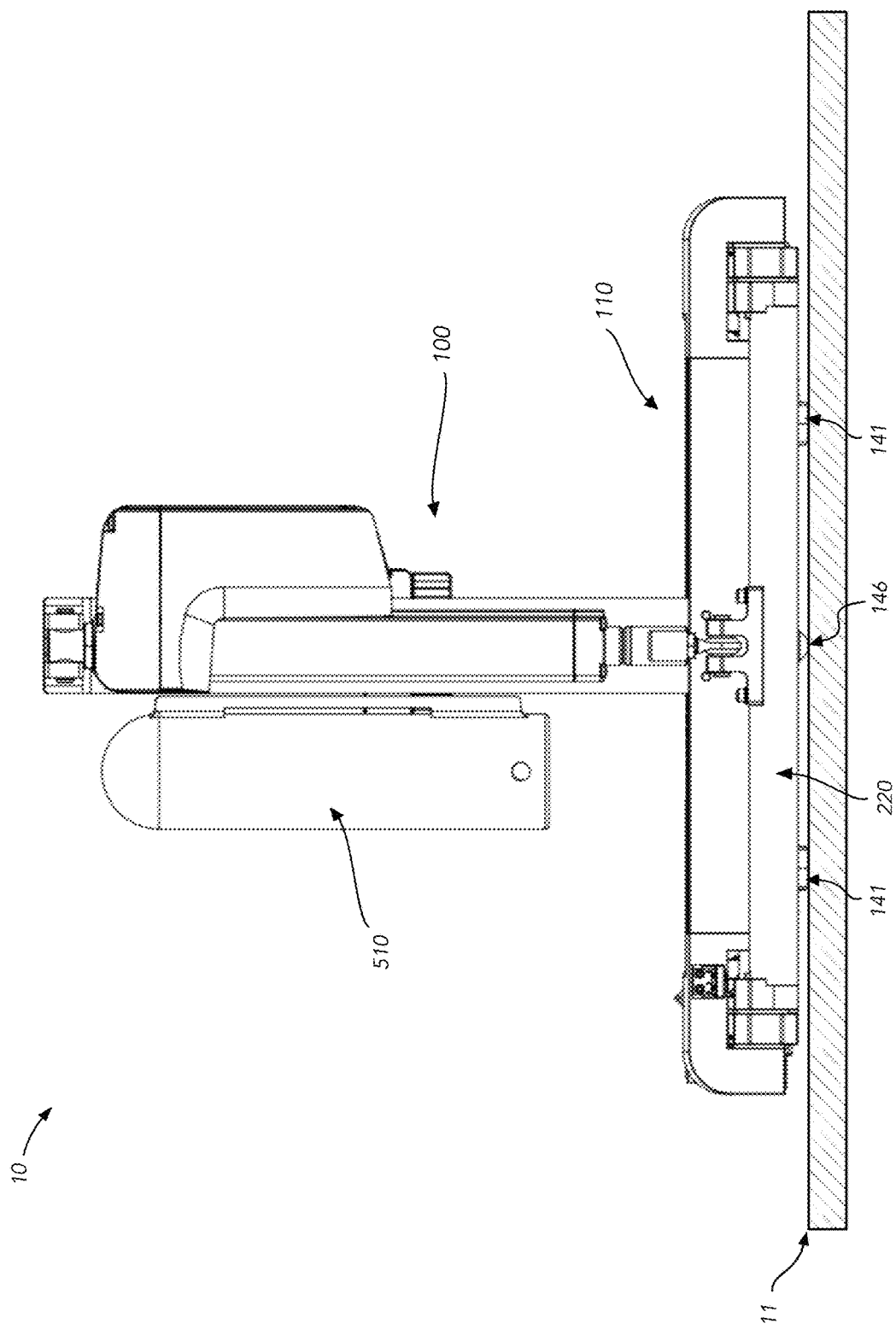
Figure 6:
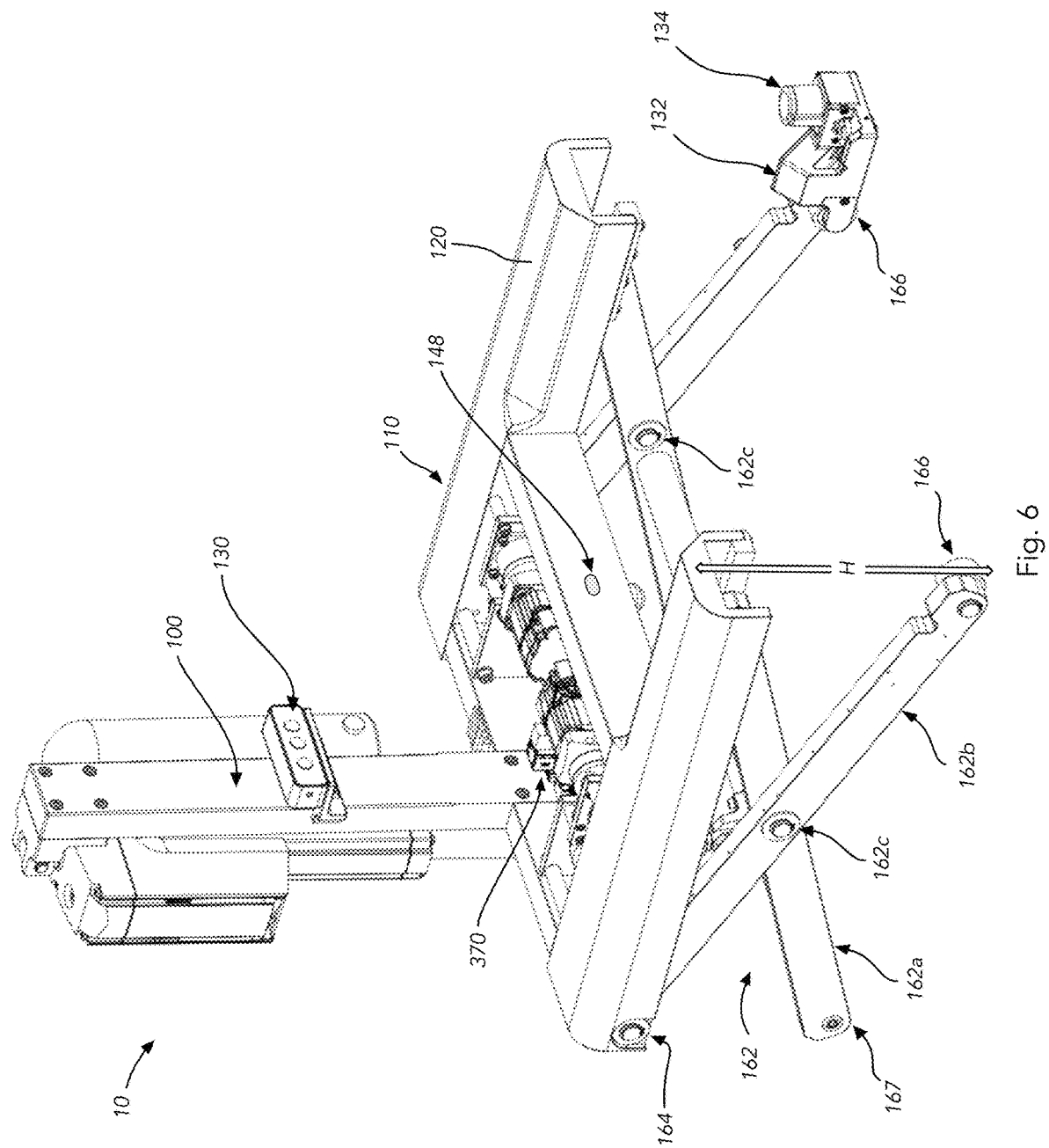
Figure 7:
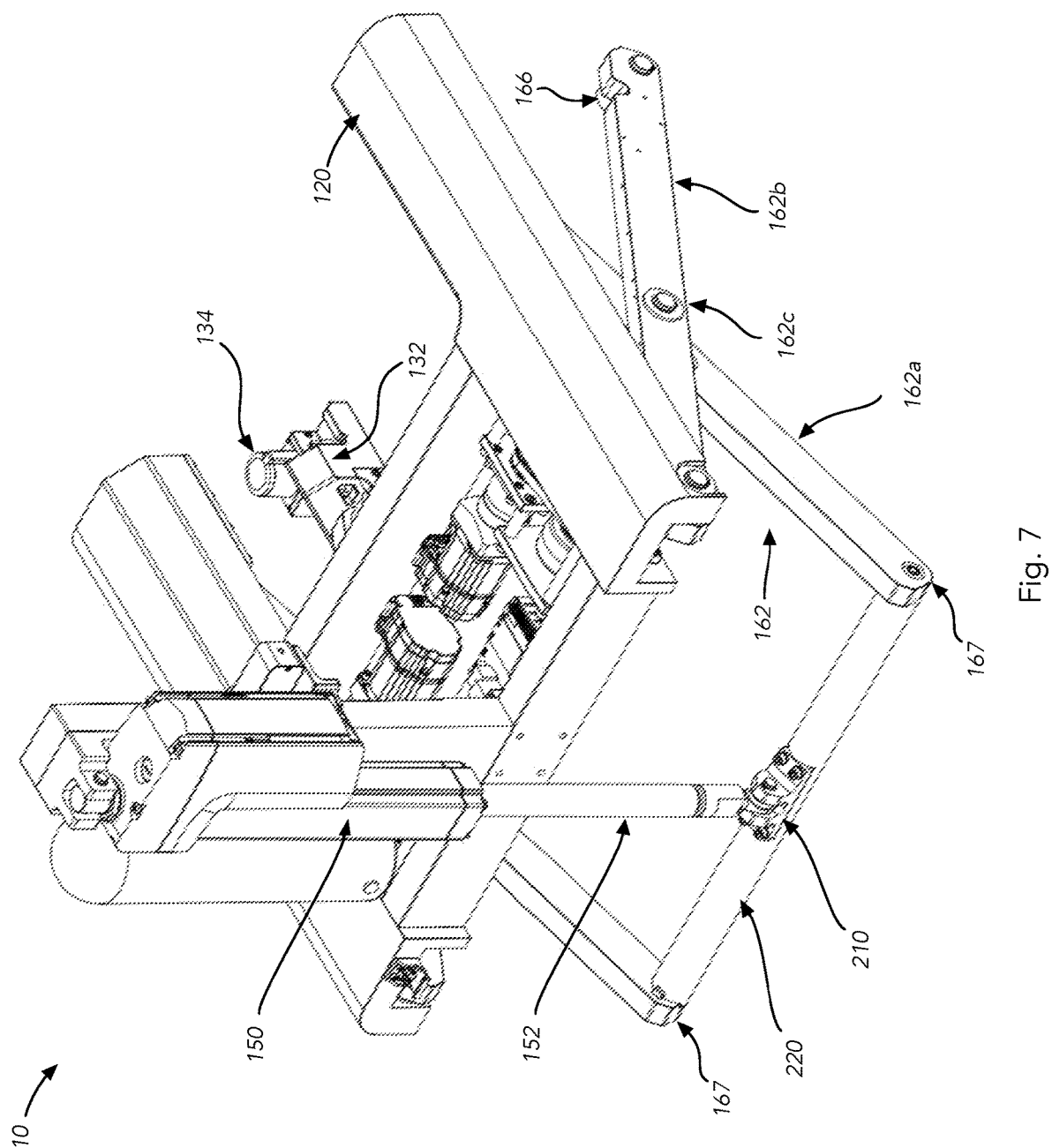
Figure 8:
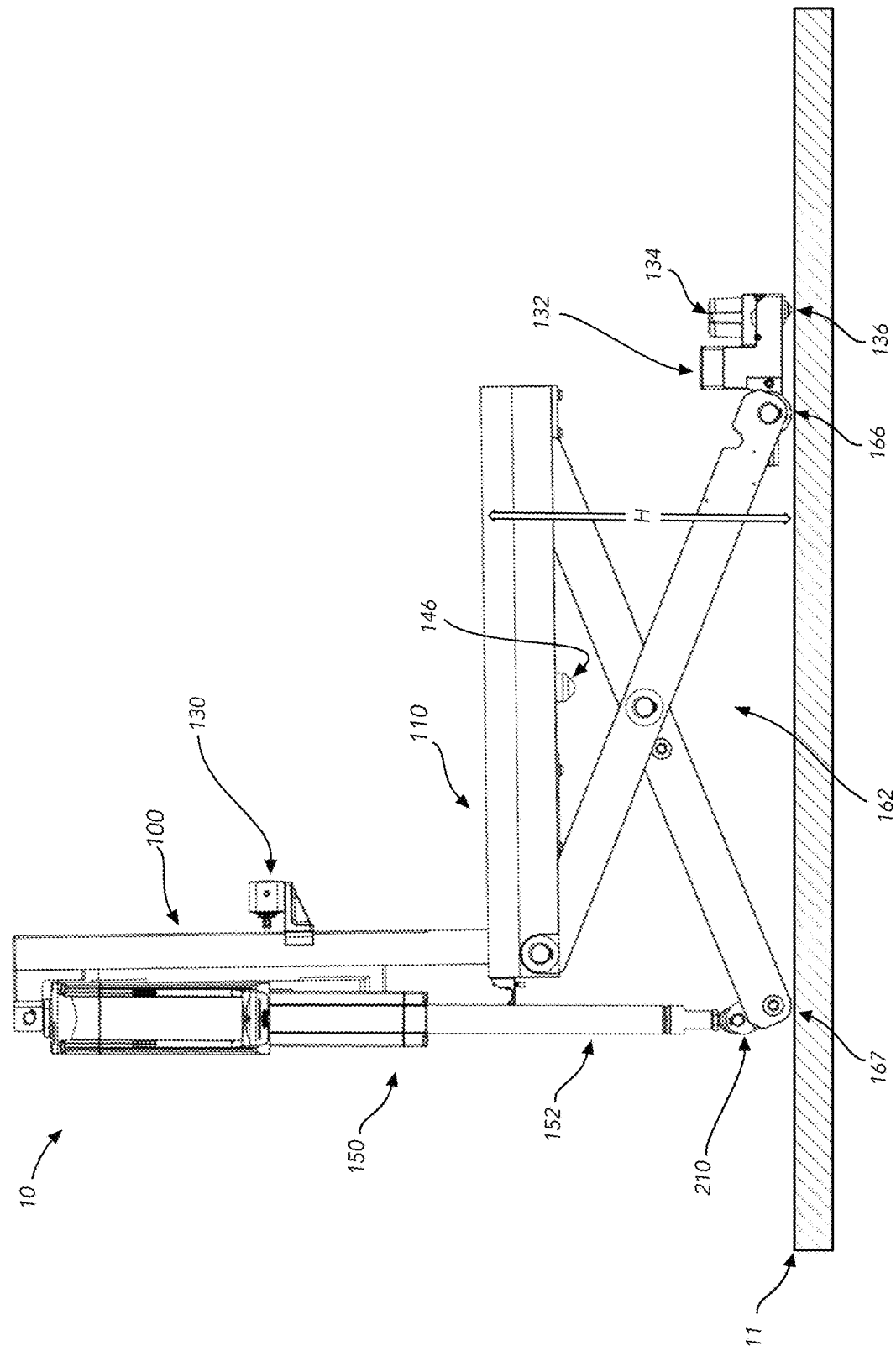
Figure 9:
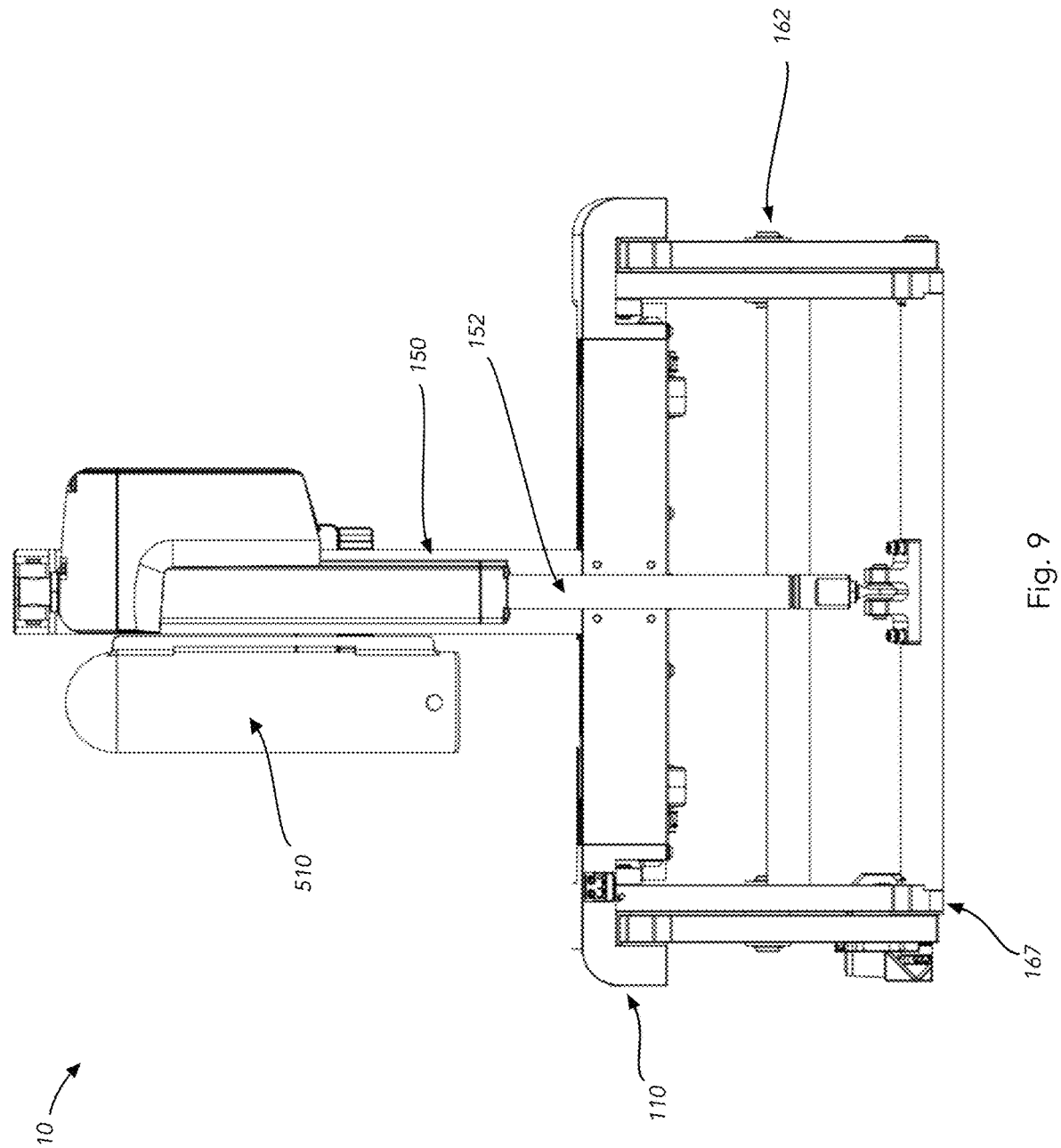
Figure 10:
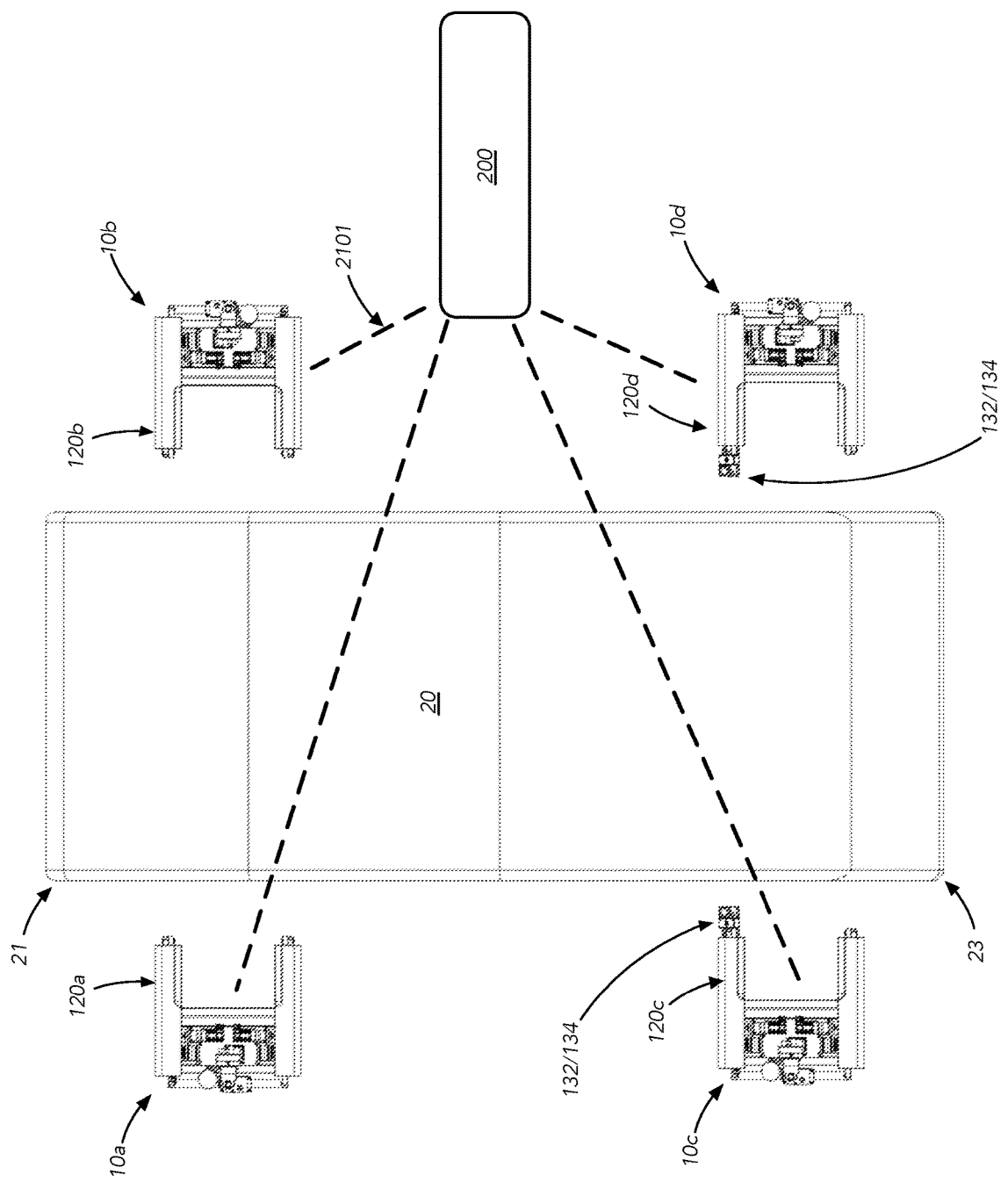
Figure 11:
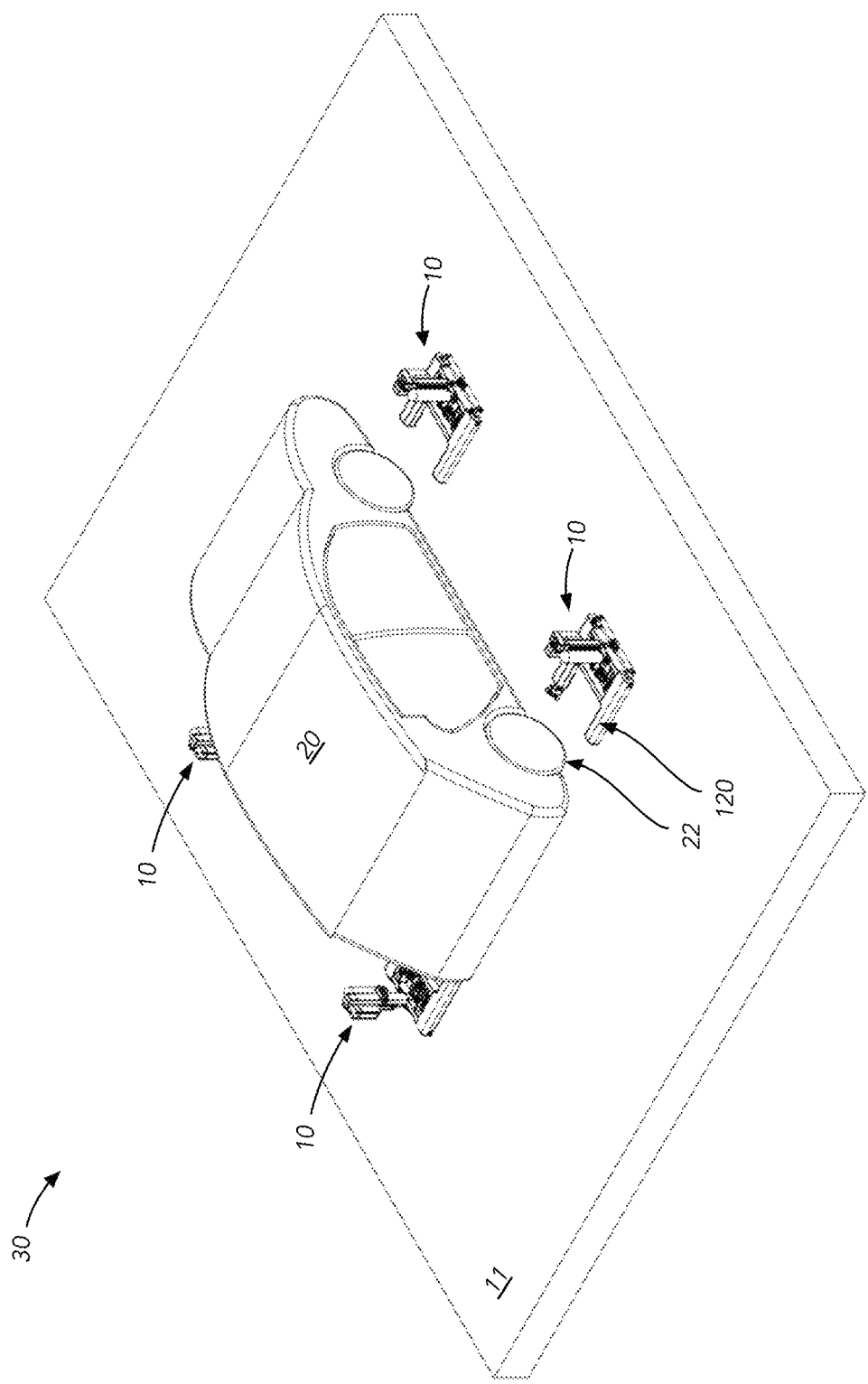
Figure 12:
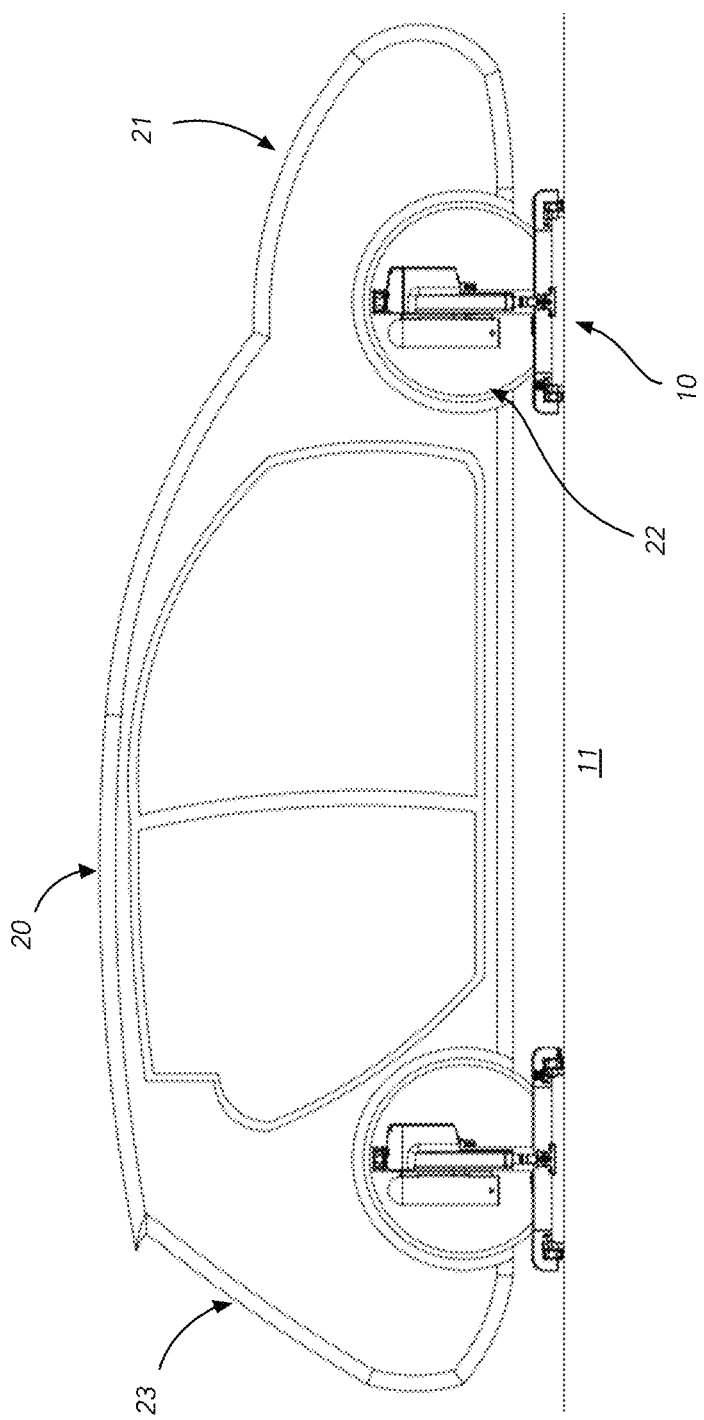
Figure 13:
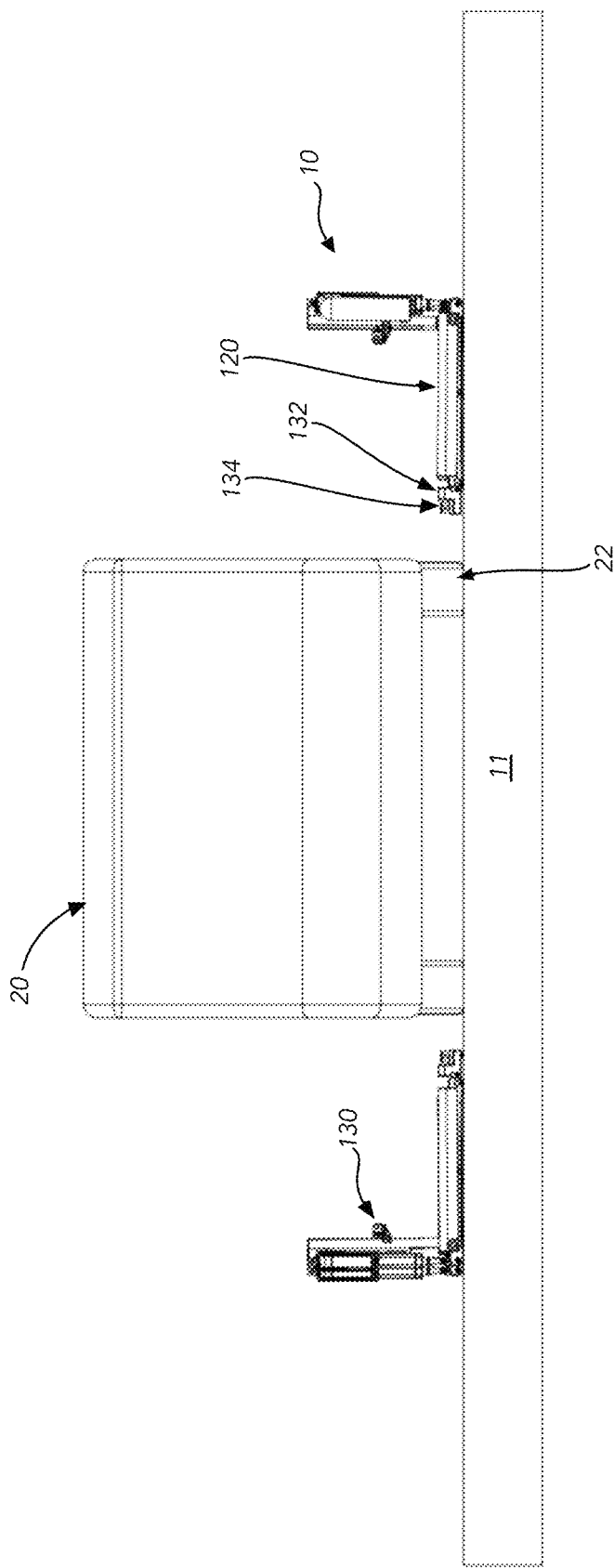
Figure 14:
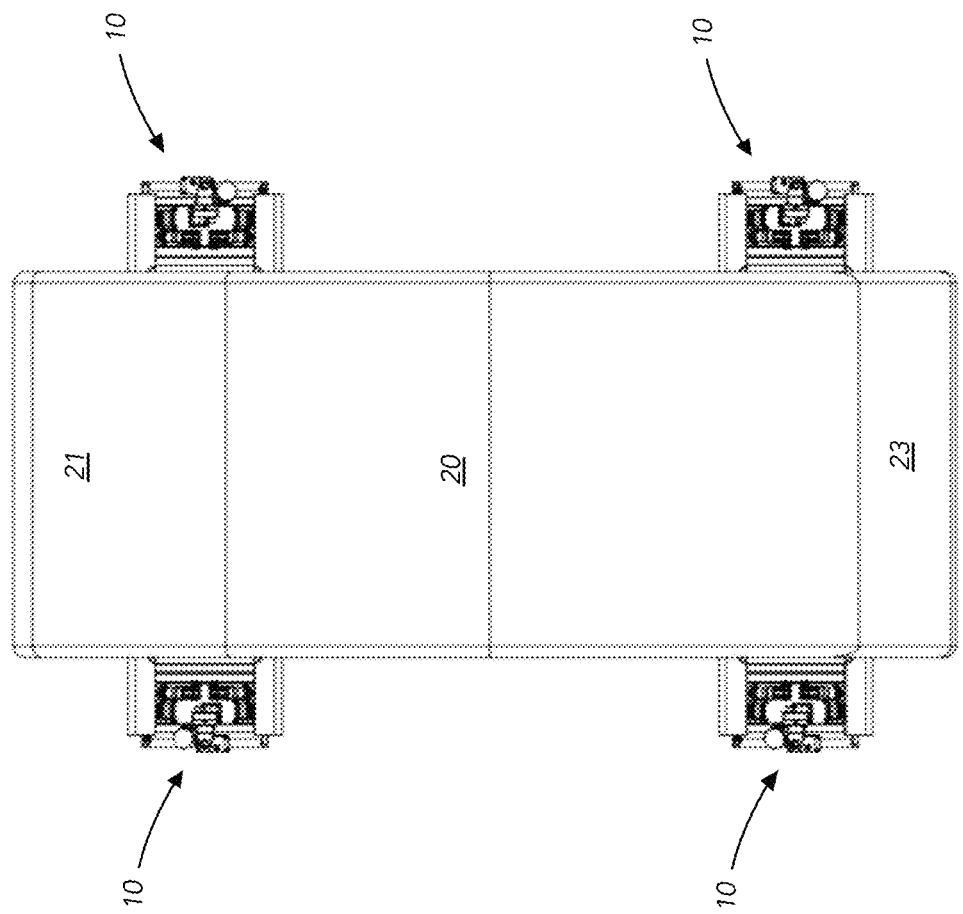
Figure 15:
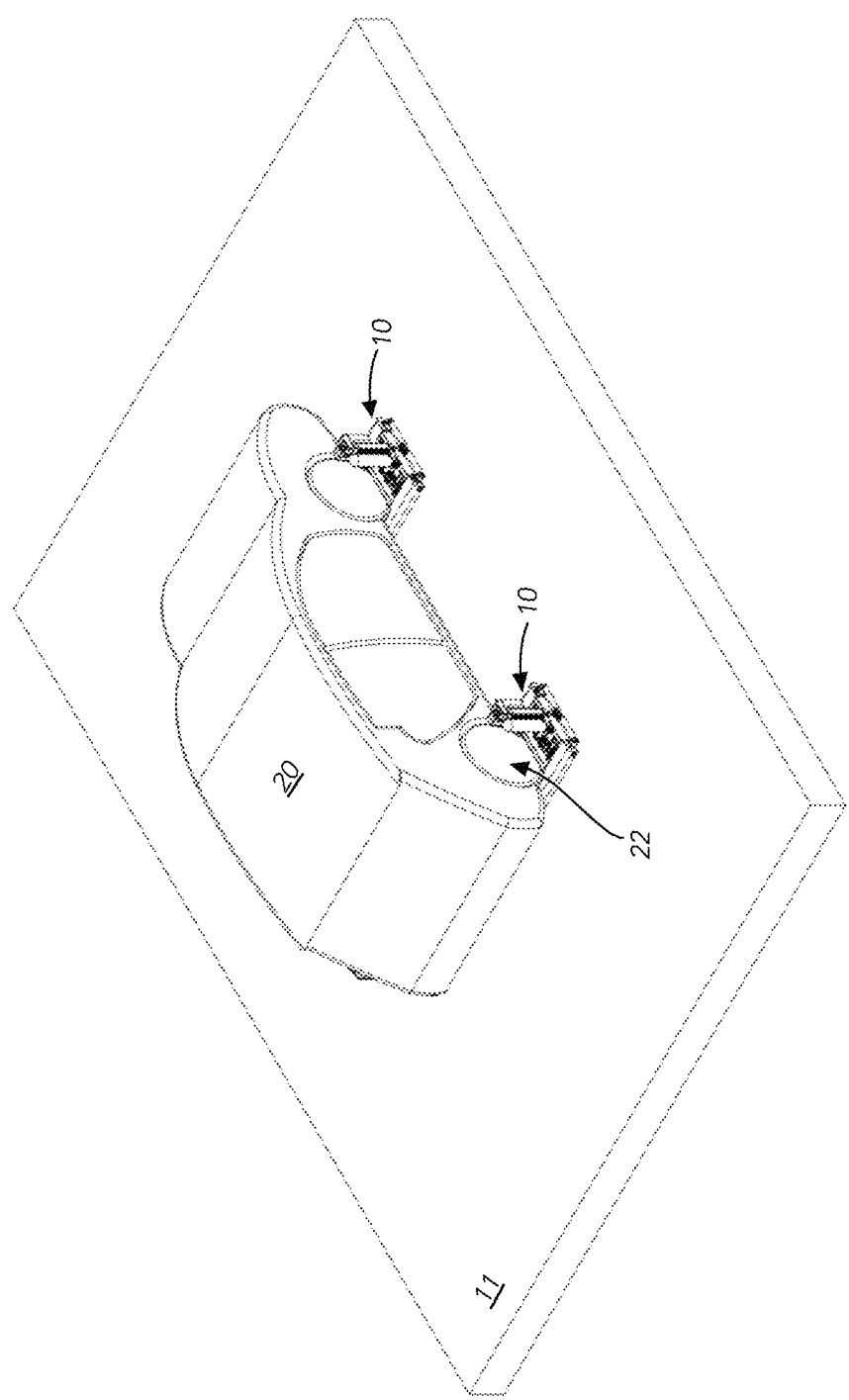
Figure 16:
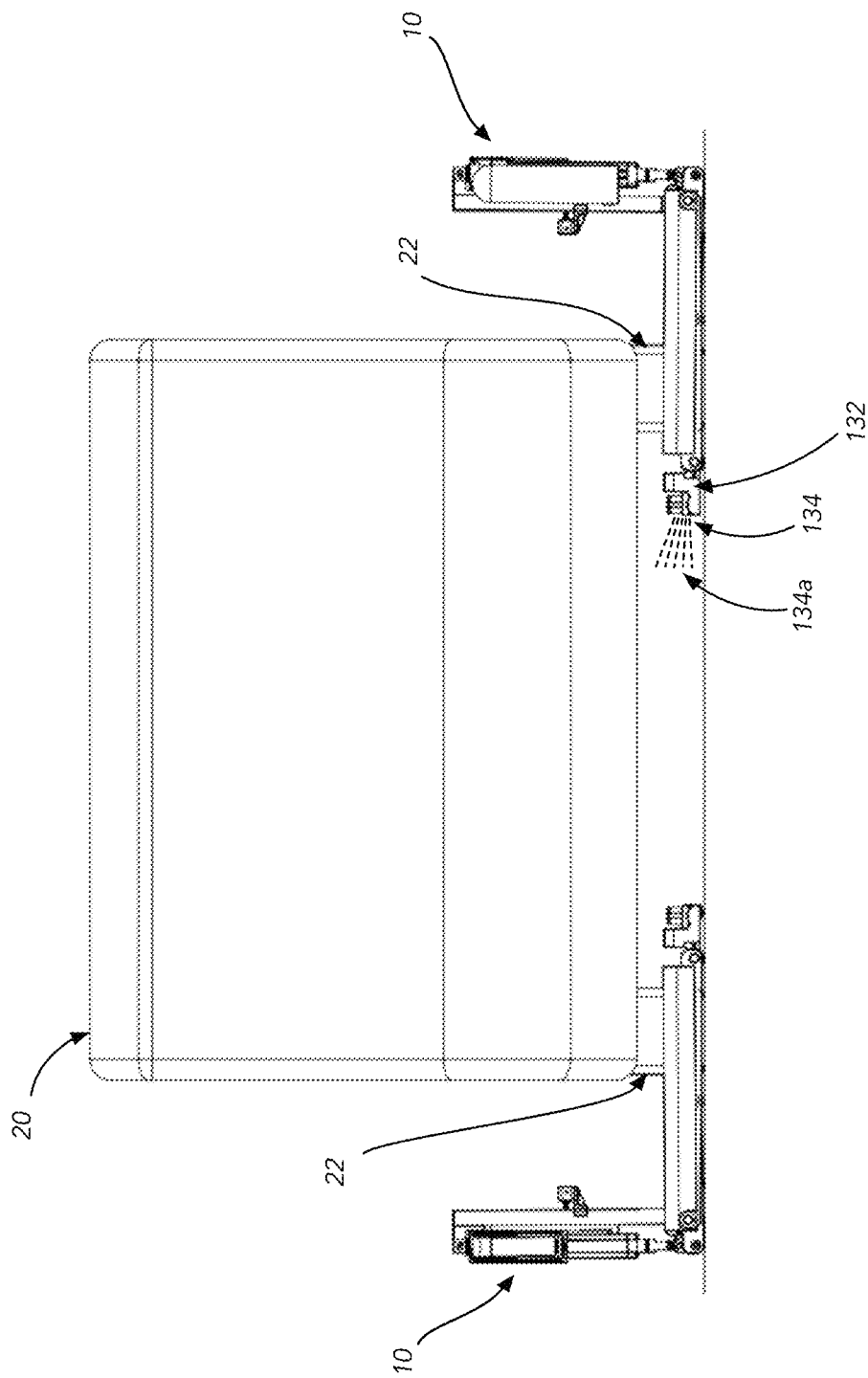
Figure 17:
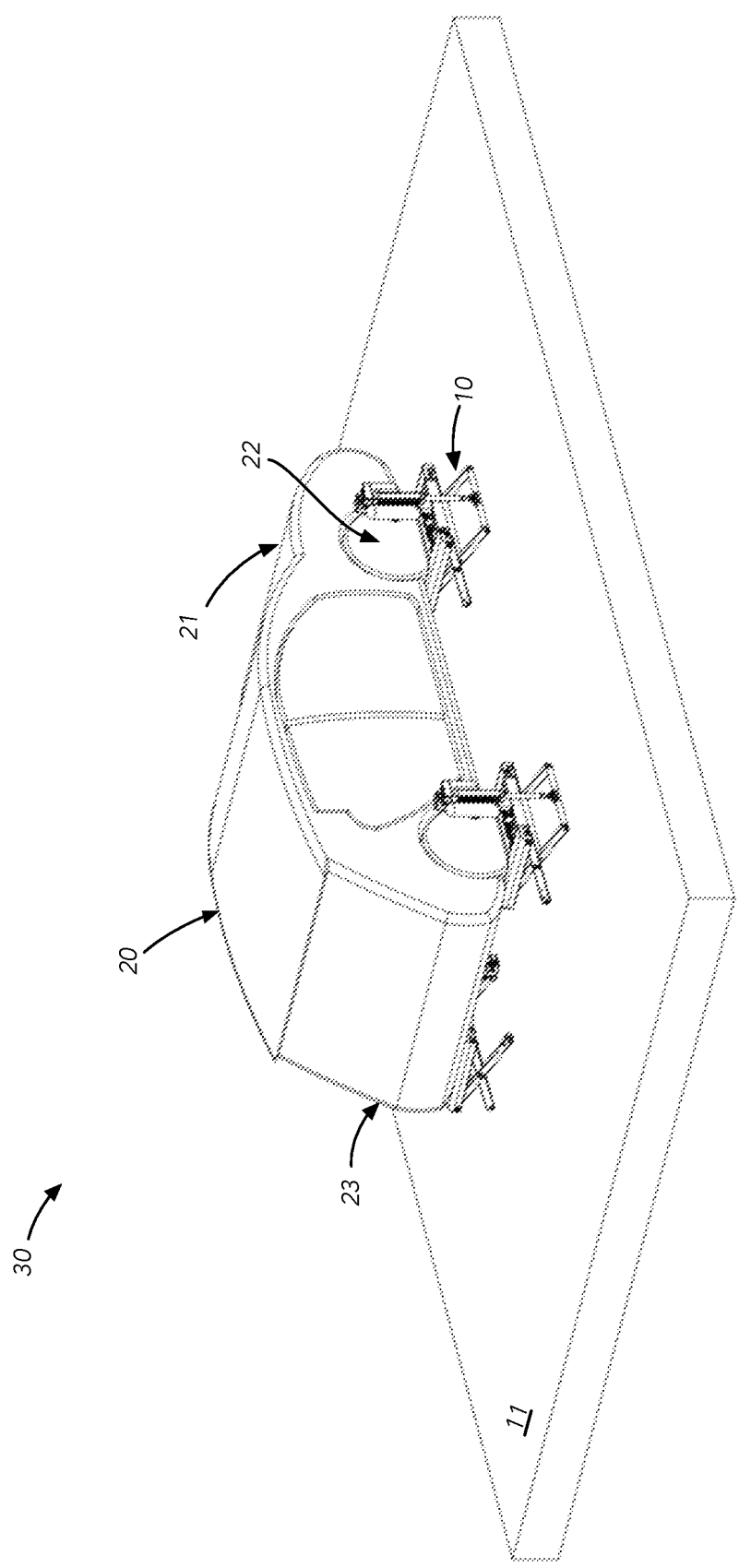
Figure 18:
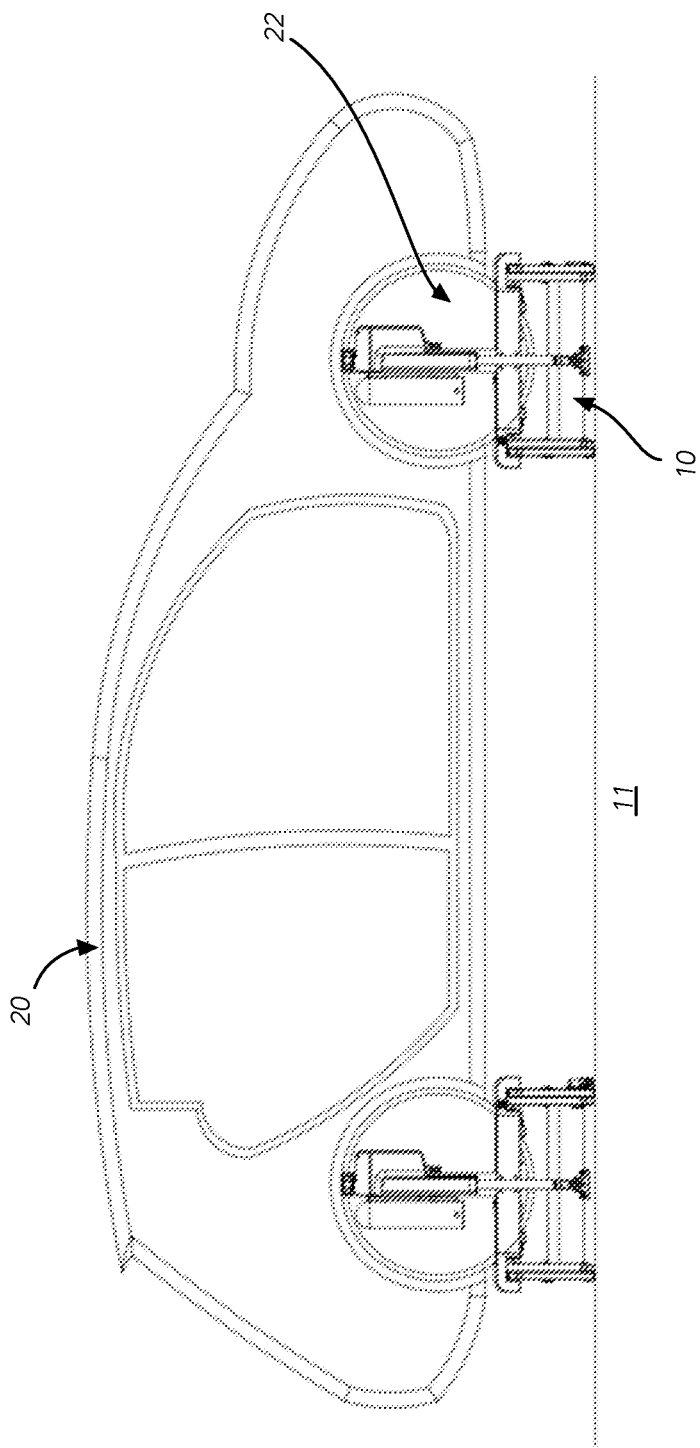
Figure 19:
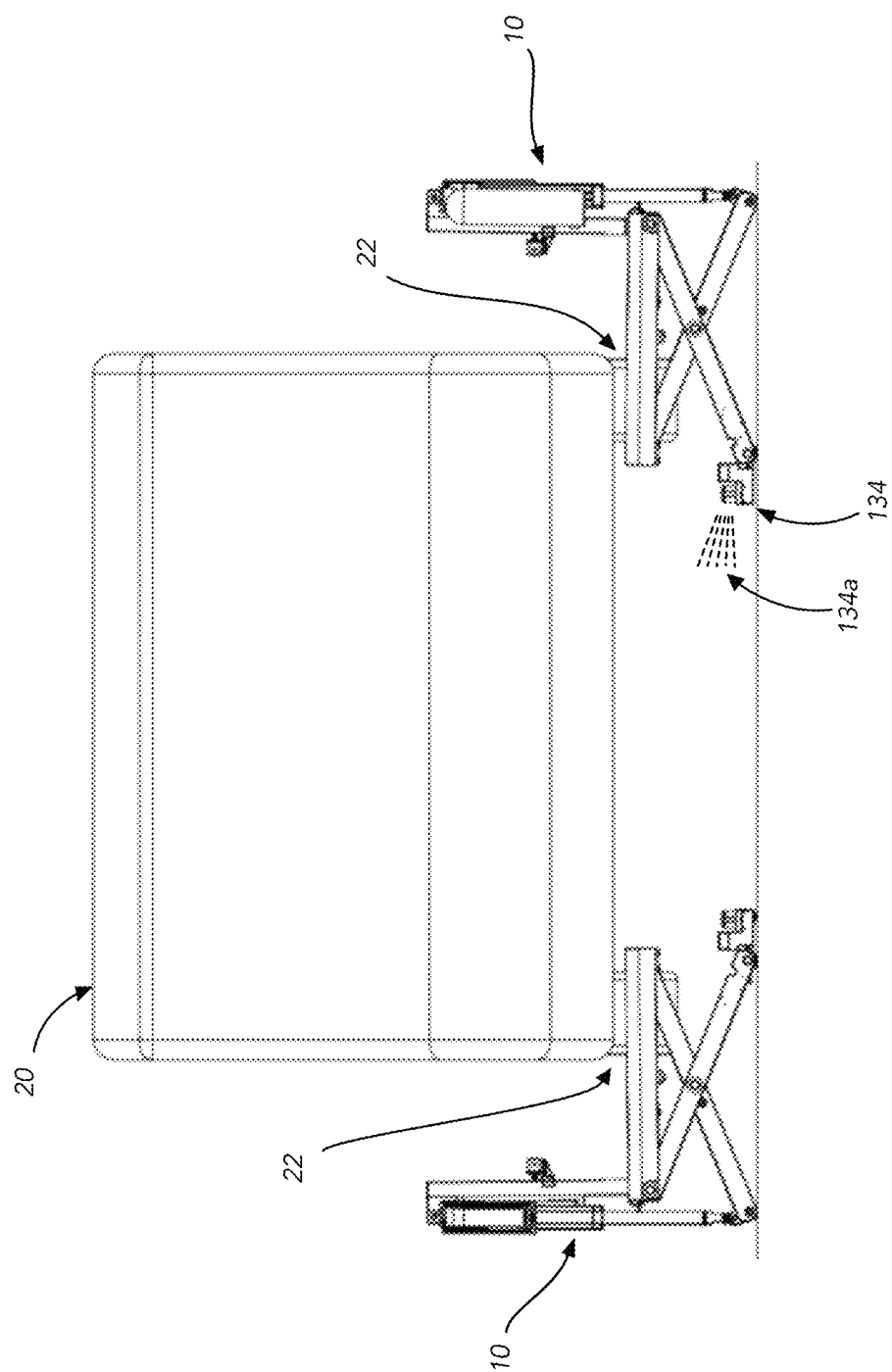
Figure 20:
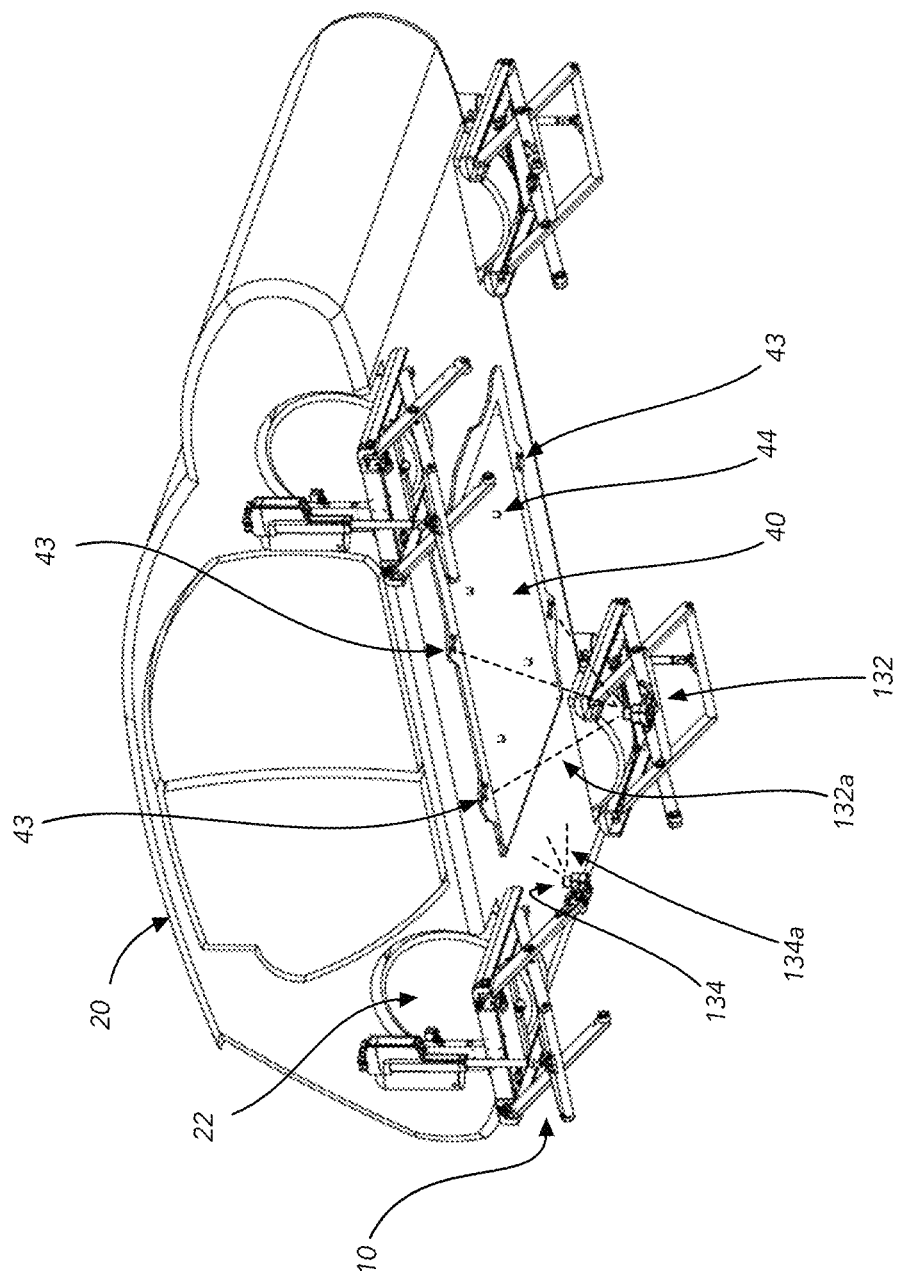
Figure 21:
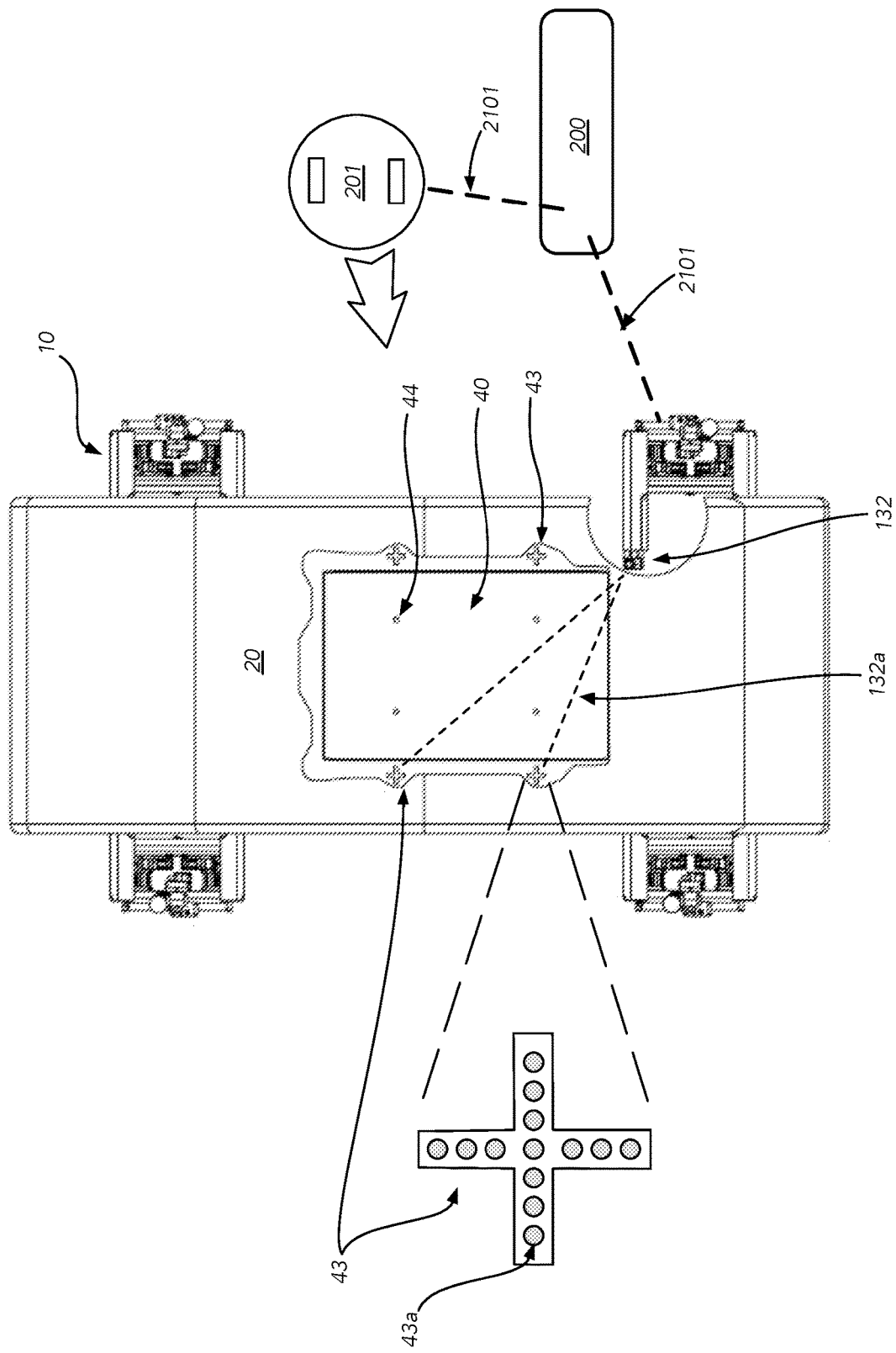
Figure 22:
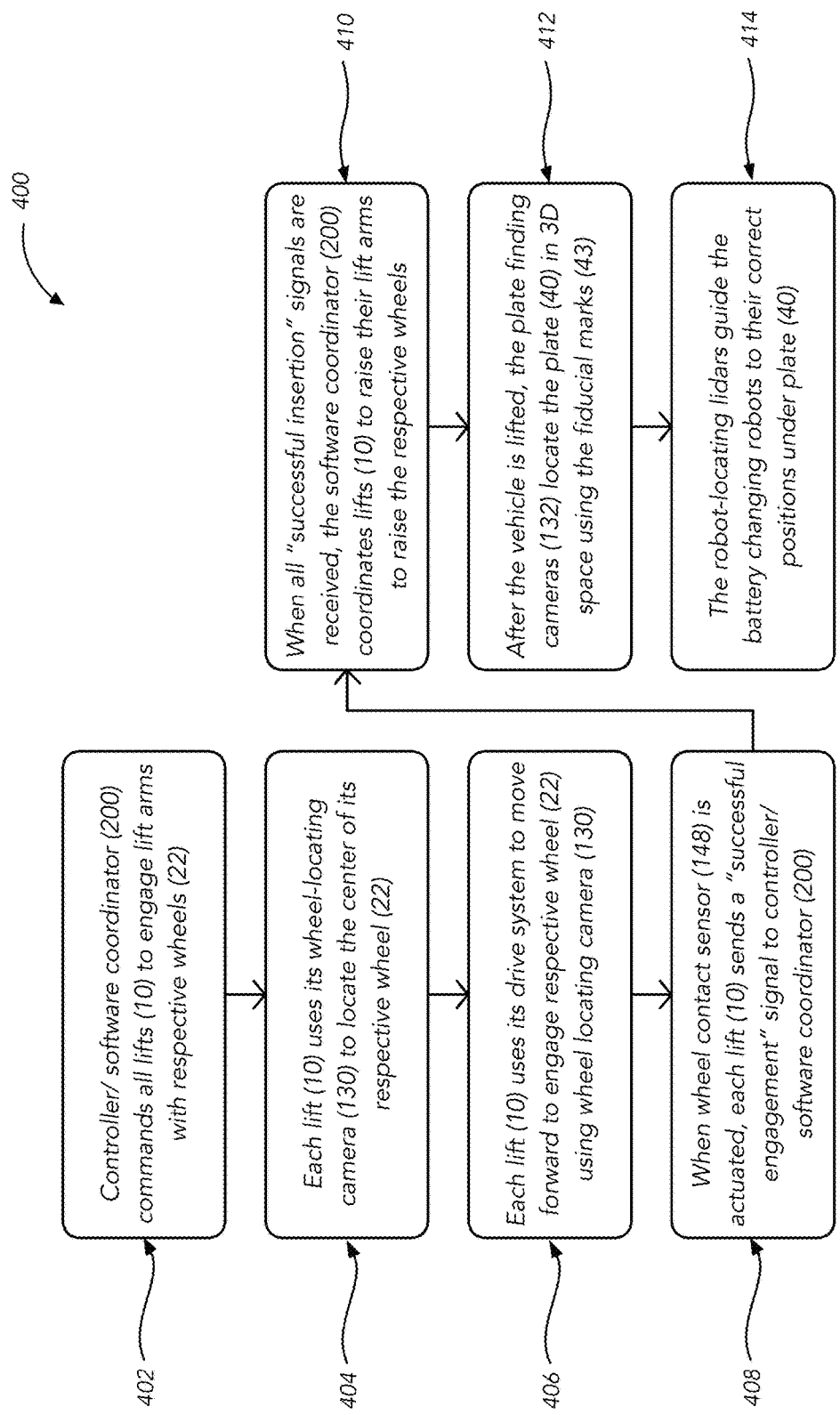

For a fuller understanding of the nature and advantages of the present technology, reference is made to the following detailed description of preferred embodiments and in connection with the accompanying drawings, in which:

FIG. 1 illustrates a top view of an autonomous lift system;
FIG. 2 illustrates a rear three-quarter perspective view of lift system;
FIG. 3 illustrates a top view of a lift system;
FIG. 4 illustrates a side view of lift system;
FIG. 5 illustrates a rear view of lift system;
FIG. 6 illustrates another front three-quarter perspective view of an exemplary lift system;
FIG. 7 illustrates a rear three-quarter perspective view of an exemplary lift system;
FIG. 8 illustrates a side view of lift system with extendable member in the extended state;
FIG. 9 shows a rear view of the lift system in its raised, extended or loaded state;
FIG. 10 shows a plurality of lift systems acting together to raise a load such as a motor vehicle or other load;
FIG. 11 illustrates an environment where a motor vehicle (car) is to be lifted;
FIG. 12 illustrates a side view of car parked on a ground or floor surface;
FIG. 13 illustrates a rear view of car and lift systems on a ground surface;
FIG. 14 illustrates a top view of a car with forward end and rear end;
FIGS. 15 and 16 illustrate exemplary lifts engaged onto respective vehicle wheels;
FIGS. 17 through 19 illustrate views of a lifted vehicle;
FIG. 20 shows a raised load or vehicle and a plurality of lift systems;
FIG. 21 illustrates a bottom view of a lifted vehicle; and
FIG. 22 illustrates an exemplary method or process.

DETAILED DESCRIPTION

FIG. 1 illustrates a top view of an autonomous lift system 10 in a lowered, unloaded or non-extended state. The system can generally be oriented and operated so as to exert a translational force in fairly any desired direction as will be explained below. For simplicity of reference and not limitation, we provide examples where the system is positioned on a solid foundation, floor, pavement or the like, and where the system is used to lift a load such as the wheel of a motor vehicle. However, it is understood that fairly any load can be lifted or pushed by a force exerted by the present system, in any direction (e.g., sideways or upside down) without loss of generality.

The system 10 is self-driven so that it can move about using a locomotion system 140. The locomotion system may drive the system around, e.g., over the floor of a workshop or industrial facility with the help of one or more motors and a set of drive wheels and/or rollers or casters. A suitable arrangement of load bearing arms 120 (which can differ in configuration from the examples shown depending on the application) are used to force a load, e.g., raise a load as will be explained in more detail herein. The load bearing arms 120 generally move along a lift axis 102 (e.g., up and down along a support stage 100 in the shown example) but as stated the movement can be applied in any direction as well depending on the orientation of the system.

In one or more embodiments, the present lift system incorporates a lifting mechanism that applies a suitable force to displace or lift a load. The lifting mechanism may comprise a lift stage (100) to which a lift actuator 150 may be coupled to cause movement of an extendable member 152 along the lift axis direction 102. Non-limiting examples of a lift actuator 150 include: a linear actuator, hydraulic piston and cylinder arrangements, telescoping motor shafts, rotating lead screws, pneumatic actuators, or others as would be suited for a given application.

In some non-limiting embodiments, the lift actuator is an assembly acting between the lift stage 100 and support stage 110 so as to translate or raise the support stage 110 along a direction of lift axis 102. The load bearing arms 120 may be integral to or mechanically fixed to the support stage 110 so that the load bearing arms 120 also move corresponding to a forced movement of the support stage 110. Therefore, in an aspect, one or more systems 10 can include substantially orthogonal support stage 110 and lift stage 100 assemblies, and these assemblies can be rigidly fixed to one another using casting, welding, or bolting of the lift and support assemblies to one another.

Other auxiliary components of system 10 may be housed inside or proximal to support stage 110. For example, the lift motors of the locomotion subsystem 140 can be disposed among the structural members of the support stage 110.

The system 10 is preferably autonomous in that it can sense aspects of its state and surroundings and can move itself or maneuver to be in a position relative to a load that the system is tasked with moving. In an aspect, the system 10 is capable of detection and identification of various objects in its surroundings using one or more optical sensors, cameras or imaging devices 130 integrated into system 10. The optical sensor or camera 130 in one example can be adapted for imaging a scene in its field of view and sending image files or other data to a processor (e.g., an image processor, CPU, GPU, etc.). The optical sensor 130 can thus have its own processing capability In the example of a lift for raising a wheeled motor vehicle such as a car or a truck, a system 10 may be dispatched to each such wheel (for example one lift 10 to each of four wheels typically located at the four corners of the car). A set of coordinated lift systems 10 can thus raise a car where each deployed lift system 10 acts to: (1) locate a respective wheel of the car to be raised using, e.g., the on-board wheel locating camera 130; (2) propel or move the system 10 using the on-board locomotion system 140 to position the load bearing arms 120 with respect to (e.g., around) the target wheel to be raised; (3) when each needed lift system 10 has engaged its respective target wheel, actuate the lifting actuator 150 to force the load bearing arms 120 upwards to lift the wheels (and car) up off of the ground. The reverse sequence can be used to lower and disengage from the load and move the lift systems 10 back to their base, power charging station, to its next target load, or just safely out of the way so the load can move along if the load is a motor vehicle that will pull away after servicing.

In an aspect, several lifts in a coordinated lift system can be operated to inter-communicate (directly on a point-to-point basis or indirectly through a common communication point or server) so as to actuate each of the lifts according to the collective needs of a mission. In an example, a plurality of such lifts (e.g., four lifts) can be applied as mentioned to respective four lifting points on a car (e.g., jacking points, wheels/tires, or other lifting points). The four lifts in such an example can be coordinated to raise the car at compatible rates (speeds, displacements, accelerations) to safely and efficiently place the car at a height needed for servicing such as for replacing an under-chassis battery unit or units. A central coordinator (e.g., processor circuit and/or machine-readable instruction set) can be used to coordinate the lifting efforts of each lift unit in a multi-lift system through wired or wireless communication with a communication and/or processing unit in each such lift, directing each respective lift to act as necessary.

The system 10 can be equipped with a variety of other features and components that will be mentioned in more detail herein. In one aspect, the system 10 uses a load engagement sensor 148, which senses when a lift 10 is properly engaged with a target load. For example, load engagement sensor 148 may comprise a wheel contact sensor that determines when the lift system 10 has moved up against its target load (wheel). In an instance, the lift system 10 can be configured and arranged to move towards and to engage its target load (such as a vehicle wheel), and upon sensing proximity or contact with the load, the system 10 may stop its movement. The load engagement sensor can therefore comprise a pressure switch, limit switch, proximity sensor, camera, ultrasound/sonar transducer or other suitable means. The load engagement sensor may further or instead comprise an optical or image-based sensor such as a camera to confirm the proper engagement of the lift with the target load, e.g., vehicle wheel or jacking point.

FIG. 2 illustrates a rear three-quarter perspective view of lift system 10 according to one or more non-limiting embodiments, in which the system is in its lowered, unloaded or non-extended state. This view also shows an exemplary arrangement of internal components such as processing circuits and locomotion components, which are nestled into the support stage 110. We can see one or more drive wheels 141 used to move the system 10 around so it can be positioned in place to engage its target load. This view shows an exemplary arrangement of mechanical members that allow the system to raise its load bearing arms 120 as needed. We see a lift actuator 150 that provides the force to move the load bearing arms 120 and load. A portion 152 of the lift actuator 150 can extend out to elongate the lift actuator assembly 150 and raise the load. A mechanical attachment point or pivot 210 connects the extendable member 152 to a lower connecting bar 220 so that the lift and support stages 100, 110 can rise upwards, pressing down at attachment point 210. As will be seen below, the apparatus mechanically articulates about a bearing, pin or pivot 221 to allow a scissor-lift movement of the stages 100, 110 to rise up from their lowered position (as shown in FIGS. 1, 2) to their raised, loaded or extended position (as shown in FIGS. 6 and 7).

FIG. 3 illustrates a top view of a lift system 10. The support stage 110 contains the locomotion assembly as mentioned before, including one or more locomotion drive motors 142 and corresponding drive wheels 141. Those skilled in the art will understand that other examples can be used for locomotion in the present system, including for example tracks, casters, bearings, rollers or other components. Here, driving one or more of the drive wheels 141 will cause the system 10 to translate or turn as it moves into a specified position to engage or disengage its load.

FIG. 4 illustrates a side view of lift system 10 as described in its lowered, unloaded or non-extended state. In the shown example, the lift system 10 sits on the ground 11 and is intended to raise a load upwards by raising the load bearing arms 120 until the load is at a desired height. We note in the non-limiting example of FIG. 4 that the system 10 is supported at least at drive wheels 141 and caster roller ball or wheel 146. The system 10 can therefore use its locomotive system to travel over the ground surface 11 to move from one location to another as directed by its control system, or another control system coupled to the lift system 10. We also note that in this non-limiting embodiment, wheels 166 and 136 are slightly raised above the ground level 11. In various embodiments, as can be seen below, the wheels 166 and 136 may be lowered to contact the ground level 11 when the system 10 is stationary and going into its raised or loaded state, as will be illustrated in a non-limiting example below.

FIG. 5 illustrates a rear view of lift system 10 in its lowered or unloaded state. This is the state in which the system 10 travels about its environment in an autonomous way according to one or more embodiments. As mentioned, a universal ball roller or caster wheel 146 and a pair of drive wheels or treads 141 are usable to translate and turn the system 10 as it drives over the ground surface 11 towards a target load.

FIG. 6 illustrates another front three-quarter perspective view of an exemplary lift system 10 showing the support stage 110 raised above the ground to some desired height (H). When in the raised, extended or loaded position (load is supported by load-bearing arms 120 but not shown here for clarity) the lift is secured on the ground in the desired position and rests on wheels 166 and heel support points 167.

This view shows how, in some embodiments, the support stage 110 and load-bearing arms 120 are raised to a height (H) using a scissor lift mechanism 162 comprising a pair of crossed legs 162a, 162b pivoting about a pin, bearing or pivot point 162c. As the scissor lift 162 opens to its extended or raised state, supporting heel points 167 rests on the ground and forward scissor lift support wheels 166 are drawn backwards towards heel points 167. Pivot points or bearings 164 are also rotated during the raising or lowering of support stage 110.

FIG. 7 illustrates a rear three-quarter perspective view of an exemplary lift system 10. The lift 10 is in its raised, extended or loaded position. The lift in this non-limiting embodiment is securely resting on its rear heel points 167, which can also be the rearmost points of one leg 162a of a scissor lift mechanism 162 as mentioned above. We see that an actuator 150 has extended its extendable or telescoping member 152, which in the extended or elongated state shown causes the scissor lift to be raised, raising load-bearing arms 120.

FIG. 8 shows a side view of lift system 10 with extendable member 152 in the extended state extending from linear actuator 150 in this example. While the system 10 rests on and moves over the ground 11 using caster ball or wheel 146 in the lowered state, in this raised state the caster ball or wheel 146 is elevated with support stage 110 and does not touch the ground 11. Instead, the system is secured and rests on the rear heel points 167 of scissor lift 162, and forward wheels 166. The forward camera 132 and lidar 134 assembly rests on a caster ball or wheel 136 that contact the ground in the shown raised configuration of the lift 10 (but which do not normally touch the ground if the lift 10 is in its lowered state per FIG. 4).

FIG. 9 shows a rear view of the lift system 10 in its raised, extended or loaded state. The autonomous lift system 10 carries one or more sources of on-board power. For example, an electric battery 510 can act as a source of power to drive the on-board locomotion system and/or to move the lift stage 110 and scissor lift mechanism 162.

In an aspect, the autonomous lifts 10 can self-direct themselves to a recharging station (e.g., at a central service bay) when not in use so that they can replenish their onboard power units (batteries) from a charging station or source of electrical power.

We now refer to FIG. 10, which shows a plurality of lift systems 10 acting together to raise a load such as a motor vehicle or other load 20. The present invention comprehends a plurality of lift systems 10 that are in direct communication with one another and/or communication with a central or remote or local dispatch system that coordinates the activities of each individual lift system 10 using communication signals 2101. Specifically, the multi-lift architecture can employ a plurality of lift systems 10a, b, c and d that are in direct communication (e.g., wireless communication) with one another in some examples, while in other examples the plurality of lift systems 10 a, b, c and d may be coordinated by a central processor or server or shared controller 200 as shown. In some examples, an angle of tilt or aspect of displacement or movement of the load (e.g., car) can be detected by sensors on the lifts or on the load (e.g., car) to determine whether the load (e.g., car) is being raised at a proper or desired rate or attitude. This can avoid unwanted tilting or imbalance of the load on its lifts and be more safe for occupants of a vehicle being lifted if the occupants are in the vehicle during the lifting operation. In one example, the sensors are distance sensors that determine a distance off the ground of one or more points on the car. The sensors can also determine a vertical displacement of the lift's load bearing arms and then infer how high the load(s) have been raised. But other tilt sensors, accelerometers, optical cameras, radar, lidar, ultrasound transceivers, etc. can be employed to monitor the height and/or attitude of a load.

For example, in raising a motor vehicle 20 with four wheels, four lift systems 10a, b, c and d are used to raise the respective wheels up off of the ground in a controlled way, for example to achieve a level attitude of the raised car if desired (meaning to raise each corner of the vehicle by a substantially equal amount and/or at a substantially equal rate). In other examples, a front end of the vehicle 21 can be raised more than its rear 23, or the passenger side only may be raised, and so on. Those skilled in the art will appreciate the various benefits of coordinating the actions of more than one lift system 10 in a multi-lift environment, including by wirelessly communicating between a central processing system (e.g., a server or controller) that is in data communication with each lift system 10 of the multi-lift architecture.

One aspect may include a status reporting signaling operation whereby individual lifts in a multi-lift system will transmit a status signal to a central controller (by wired or wireless data signaling means). The status reporting or signaling can deliver information from each lift unit to a central controller informing the controller of any trouble messages, or to report a height, speed, acceleration, force or other sensed parameter. The signals may also inform a central controller that a lift has reached its target or its maximum displacement. The controller can in turn return control signals to the lift units to halt, speed/slow, or otherwise control the rate of operation of the lifts. An external agent (hardware and/or software) can then control a next step of operation of the lifts.

We said that the present architecture and method can be applied to a wide variety of applications and to raise any type of load or move the same. One such application is for raising wheeled motor vehicles such as passenger cars, light trucks and the like. In this case, one lift system 10 can be dispatched to each of the vehicle's wheels at the front of the vehicle 21 and rear of the vehicle 23. Lift systems 10*a* and 10*b* are sent to raise the respective left and right front wheels of vehicle 20 while lift systems 10*c* and 10*d* are sent to raise the respective rear left and rear right wheels. In this application, as will be explained further below, the rear two lift systems 10*c* and 10*d* may be equipped with camera/lidar assemblies 132/134 at their inboard forward load-bearing arms 120*c* and 120*d*. Note that forward lift systems 10*a* and 10*b* are not similarly equipped with visualization camera 132 or lidar 134 assemblies. This can be done in some embodiments because the forward lifts 10*a*, 10*b* are engaging with forward vehicle wheels that can be at unpredictable angles with respect to the vehicle 20 (on account of how the vehicle approached and parked for lifting) while the rear vehicle wheels are usually aligned with the vehicle 20. However, this is not a limitation of the present invention, which can also comprehend four-wheel-steering vehicles. Also, some embodiments deploy identical lift systems 10 to all wheels and all lifts 10 may have said camera/lidar assemblies 132/134, perhaps just not activating or using the assemblies 132/134 at wheels where visibility or tilt angle are not suitable.

FIG. 11 illustrates an environment 30 where a motor vehicle (car) 20 is to be lifted. The car 20 has a plurality (e.g., four) wheels 22, each of which can be considered a load for a respective lift system 10 that engages said wheels 22. In this example, the wheel 22 may also include a tire, which for the present purposes does not change the method or system of the invention, so the load-bearing arms 120 of lift system 10 can engage a tire as well (just referred to as a wheel for some or all present examples for simplicity). In an embodiment, the two parallel load-bearing arms 120 cradle the tire/wheel 22 of car 20 and the load thus rests in between the two arms 120 for raising off of a ground surface 11.

FIG. 12 illustrates a side view of car 20 parked on a ground or floor surface 11. Lift systems 10 are in place in their lowered or unloaded state, each engaged with a respective wheel or tire 22 of the car and ready to raise its load.

FIG. 13 illustrates a rear view of car 20 and lift systems 10 on a ground surface 11 prior to engagement with tires or wheels 22. We see that the distal or leading ends of load bearing arms 120 may be equipped with imagers, optical sensors or cameras 132 as well as lidar systems 134, which are discussed further herein.

According to the invention, autonomous lift systems 10 can self-guide themselves, using the environment imaging camera or optical sensor 130. In one embodiment, the camera 130 generates image data representing the environment before it, including the car 20, a wheel 22 and other objects, and delivers image output information to a processor. The processor can be on-board lift system 10, or can be remote, e.g., in a remote-control unit 200 as mentioned before. The processor can determine a target load (e.g., the car's wheel 22) and generate locomotion control signals that cause the system's locomotion unit described above to drive the lift system 10 towards its target. In a specific non-limiting example, the camera 130 and image processors can use the center of a circular wheel/tire 22 as a target used to determine the movement of system 10 towards engagement, but this is only one example. The circumference or other image data or model data can also be used to drive the systems towards their respective target loads.

FIG. 14 illustrates a top view of a car 20 with forward end 21 and rear end 23. A lift system 10 is in the engaged position, each set of load bearing arms 120 discussed above in place around a respective target tire/wheel 22 of the car.

The foregoing system should be understood to have utility not only in raising motor vehicles and similar machinery, but also for lifting and moving goods and objects of almost any kind. For example, a crate, box, or shipping container can also be lifted using one or more of the present lift systems according to the present method. Those skilled in the art will appreciate that a compatible shipping container, pallet, or other object can similarly be met and handled by this system, which for example can engage with one or several points on the shipping container or pallet or object to raise or move the same.

FIGS. 15 and 16 illustrate the present lift systems 10 now engaged onto their respective wheels 22 in preparation for lifting car 20 off ground surface 11. As will be described below, the system is capable of activating one or more under-carriage camera 132 and/or lidar 134 systems to determine relative locations of objects and coordinates of interest underneath a load or in the vicinity of lift system 10. For example, in an optional embodiment, camera 132 can be used to identify a relative position of a target of interest underneath a raised motor vehicle (e.g., using fiduciary marks on the vehicle or other image analysis), and lidar 134 can be used to detect and track a moving robot that approaches the vehicle 20 to service the vehicle using lidar signals or laser light 134*a*. In other words, upon engagement or after lifting vehicle/load 20, the lift systems 10 can be equipped with cameras 132 and/or lidars 134 that coordinate and control the operation of coupled service systems beneath the vehicle 20. Optionally, the under-carriage camera 132 and/or lidar 134 can be activated only after the vehicle is in its raised position, but this is not required in all embodiments, and not all embodiments require the undercarriage system 132/134.

FIGS. 17 through 19 illustrate views of a vehicle or load 20 in its raised position, with wheels 22 engaged and supported by the load bearing arms of lift systems 10 as described. As stated above, in an optional aspect, an under-carriage camera 132 and/or lidar 134 can be used to identify, locate and coordinate activities relating to under-vehicle maintenance or service once the vehicle has been raised.

FIG. 20 shows a raised load or vehicle 20 and a plurality of lift systems 10, each engaged with and raising a respective wheel 22 of the vehicle, in their raised, extended or loaded states. In one non-limiting instance, the front wheel lift systems are only used to raise the vehicle 20 or maintain it at a desired level with the rear wheel lift systems. Since this is an underneath perspective view, we can see an example of a car 20 having a cover plate 40 beneath it, which may protect and house various car equipment such as electric battery units disposed within cover plate 40 beneath the car. The plate 40 may be secured in place by a plurality of bolts or fasteners 44, which may be removed by a machine or service robot 201 for access to the equipment or batteries lying within cover 40. Also, one or more fiducial or position indicating marks 43 may be used to generally indicate position with respect to the underside of the car.

FIG. 21 illustrates a bottom view of a load or vehicle 20, raised up by a set of lift systems 10, exposing an under-vehicle plate 40 secured by a plurality of bolts or fasteners 44. In a particular example, one or more under-carriage fiducial position markers 43 may comprise a series of equally-spaced LED light sources 43*a* arranged in a pair of orthogonal line segments, e.g. in a cross shape (but other configurations are equally possible). The under-carriage camera 132 may use an optical line of sight 132*a* to one or more position locating marks or fiducial marks 43 to identify, locate or direct other equipment into place with respect to servicing the underside of vehicle 20. For example, the fiducial positioning marks 43 may comprise a series of light sources (e.g., LED lights) arranged in a pre-determined configuration, and spaced according to a known pattern, which are used by an image processor to determine a relative position of lift 10 or another object with respect to a given one or more fiducial position markers 43. Specifically, apparent size, position within an image, or relative spacing of the light sources in a marker 43, using geometric/trigonometric calculations, are used to identify the marker 43 or plurality of markers, as well as relative position of the same with respect to another object, including guiding a service robot 201 using wireless control signals 2101. The communication with robot 201 can take place in some embodiments directly between robot 201 and lift system(s) 10 or may take place through a remote control unit 200 that sends control signals 2101 to robot 201.

FIG. 22 illustrates an exemplary method or process 400, which may be implemented and encoded in computer-readable instructions stored in a data storage unit and executed in processing circuitry on-board the autonomous lift systems 10, or in cooperation with a remote controller unit 200.

In an example, software coordinator or controller 200 commands one or more lift systems 10 to engage the load bearing arm 120 with respective wheels 22 of a load such as a vehicle 20, at 402. At 404, each lift system 10 uses its wheel locating camera 130 to locate a target position, e.g., the center of wheel(s) 22. At 406, each lift system 10 drives or moves itself using its on-board locomotion system with respect to its target load to engage said wheels 22. At 408, when each lift system 10 is in the load-engaged position (e.g., as determined by a load contact sensor 148) a "successful engagement" signal is sent to the controller 200. The controller 200 commands and coordinates the raising of vehicle 20 by lift systems 10 at 410, using the on-board power units provided. Under-carriage markers 43 are located in three dimensions using under-carriage camera system 132, at 412. Then, at 414, a service machine or robot 201 can be guided to perform tasks on the undercarriage area of the vehicle 20, for example to remove plate 40 and service batteries or other components as necessary.

Those skilled in the art will also understand that the present system and method are not limited to raising objects vertically off the ground. But rather, they can be used to press, push, pull, or generally reposition or apply force to objects in any direction (e.g., sideways, downwards, etc.). Therefore, any mention of a component above being "horizontal" or "vertical" or the like is merely for explanatory purposes in that instance, but one should understand that the present system and components can be oriented in any relative or absolute direction, which will not change the scope or generality of the invention. Likewise, the dimensions, materials and specifications of the present system are described above in an exemplary manner, and can vary depending on its intended use. For example, the components of the system can be made in a size and power capacity to suit the loads and objects intended for handling, ranging from large objects like shipping containers, trucks, boats, cars and the like, to small objects like those encountered in manufacturing or detailed assembly work.

The present invention should not be considered limited to the particular embodiments described above, but rather should be understood to cover all aspects of the invention as fairly set out herein. Various modifications, equivalent processes, as well as numerous structures to which the present invention may be applicable, will be readily apparent to those skilled in the art to which the present invention is directed upon review of the present disclosure.

We claim:

1. An autonomous lift system capable of detecting a target load, moving with respect to the target load, and applying a force to displace the target load, comprising:
    a support stage;
    a lift stage, defining a lift axis, secured to and supported by the support stage;
    one or more load bearing arms translatable along an axis parallel to said lift axis, the load bearing arm(s) coupled to the support stage;
    one or more optical sensors that optically sense an environment of said lift system including said target load;
    a locomotion system comprising at least one motor and drivetrain assembly that move and position said lift system;
    a lift actuator coupled to the lift stage;
    a plurality of load-supporting casters that support a load of said lift system and permit a multi-directional rolling of said lift system, the load-support casters attached to the support stage; and
    a processor that receives an input from said optical sensors and provides a corresponding output to control said locomotion system to position the lift system and load bearing arms with respect to the target load,
    wherein:
        the lift system has a lowered state and an elevated state,
        when the lift system is in the lowered state:
            the lift actuator is in a retracted state such that the support stage, the lift stage, and the load bearing arm(s) are in a first vertical position relative to a surface on which the system can be moved and positioned, and
            the load-supporting casters are in physical contact with the surface, and
        when the lift system is in the elevated state, the lift actuator is in an extended state such that the support stage, the lift stage, and the load bearing arm(s) are raised from the first vertical position to a second vertical position relative to the surface such that the load-supporting casters are raised above the surface.

2. The lift of claim 1, said support stage and said lift stage disposed orthogonally to one another such that the support stage generally lies in a horizontal base plane and the lift stage extends upwardly therefrom along a vertical lift axis orthogonal to the base plane.

3. The lift system of claim 1, comprising a pair of horizontal load bearing arms extending parallel to one another and spaced apart so as to receive said target load between the load bearing arms.

4. The lift system of claim 1, said lift actuator comprising a powered linear actuator having an extendable member that extends or retracts along said lift axis to change an effective length of said linear actuator and to cause a corresponding translation of said load bearing arms.

5. The lift system of claim 1, comprising a scissor lift assembly having one or more pairs of crossed arm members, pivoting about a common pivot point, and mechanically coupled to said support stage and to said load bearing arms so that a relative movement of said crossed arm members causes a corresponding translation of said load bearing arms parallel to said lift axis.

6. The lift system of claim 5, said crossed arm members comprising two pairs of scissor lift crossed arm members, said two pairs of scissor lift crossed arm members mechanically coupled by a lateral shaft.

7. The lift system of claim 6, said lateral shaft further coupled by the pivot point to a retractable linear member of a linear actuator connecting said lift stage and said lateral shaft.

8. The lift of claim 5, further comprising:
a wheel coupled to an end of one of the crossed arm members; and
an under-carriage camera mechanically coupled to the wheel, wherein:
when the lift system is in the lowered state, the wheel is disposed above the surface, and
when the lift system is in the elevated state, the wheel is in physical contact with the surface.

9. The lift system of claim 1, further comprising a load sensor that indicates contact with, engagement with, or proximity to said target load.

10. The lift system of claim 1, further comprising an on-board power storage unit that provides power for positioning and lifting of said lift system and load bearing arm(s).

11. The lift system of claim 10, said on-board power storage unit comprising an electrical battery.

12. The lift system of claim 1, said optical sensor comprising a vision sensor or camera equipped with a light sensor and capable of generating a corresponding image of said environment.

13. The lift system of claim 1, further comprising an on-board communication unit that sends and receives communication signals to and from a remote controller in data communication with said communication unit.

14. The lift system of claim 1, further comprising a LIDAR sensor having a light emitter to emit a light and a light receiver to receive at least a portion of said emitted light after reflection of the same from an object in said environment.

15. The system of claim 1, further comprising a docking interface configured and arranged to be in electric power communication with a charging station and to receive electric power from said charging station and to recharge an on-board battery in said lift.

16. The lift of claim 1, further comprising one or more drive wheels disposed on or in the support stage, the drive wheel(s) mechanically coupled to the locomotion system, wherein:
when the lift system is in the lowered state, the drive wheel(s) are in physical contact with the surface, and
when the lift system is in the elevated state, the drive wheel(s) is/are raised above the surface.

17. A method for autonomously operating a lift, comprising:
detecting a target load including optically sensing one or more features of said target load using an optical sensor on said lift;
processing information derived from detecting said target load in a processor, and generating lift movement information for controlling locomotion of said lift with respect to the target load;
moving said lift along a surface with respect to the detected target load including driving a locomotion system of said lift with respect to the target load using an on-board motor and drivetrain assembly in said lift, the lift including a plurality of load-supporting casters that support a load of said lift system and permit a multi-directional rolling of said lift system; and
applying a force to displace the target load including applying a force to translate one or more load bearing arms of said lift against the target load and to raise the load-supporting casters above the surface.

18. The method of claim 17, further comprising centrally controlling and coordinating, using a central controller, a plurality of such lifts, each lift acting on a respective location of the target load so as to move the target load from the respective plurality of locations in a coordinated manner.

19. The method of claim 17, further comprising sensing an attitude of the target load so as to control said attitude including an angle of inclination.

20. The method of claim 17, further comprising exchanging control signals with a central controller processor including sending status signals from said lift to said central controller and receiving control signals from said central controller that direct an action by said lift.

21. A multi-lift system for servicing battery modules of an electric vehicle, comprising:
a plurality of autonomous lifts, coupled to one another and to a central controller by wireless communication signals;
each said autonomous lift comprising a respective onboard rechargeable power unit, communication unit, motorized locomotion unit, motorized lift actuator and under-carriage sensor apparatus;
wherein said lift transmits status signals from its communication unit to another lift or to said central controller, and responds to control signals received by said communication unit from said central controller; and
wherein said motorized locomotion unit operates under control of an onboard processor in said lift to approach said electric vehicle at a wheel thereof; and
wherein said motorized lift actuator operates under control of said onboard processor in said lift to engage a lift stage of said lift with said wheel and to actuate two sets of crossed legs of two scissor lifts, pivoted about two respective pivot points, to apply an upward force at said wheel so as to rise the wheel with respect to a support stage of the lift that supports the lift and said wheel; and
wherein said under-carriage sensor apparatus comprises an under-carriage optical camera and an under-carriage lidar unit, said under-carriage sensor apparatus including the under-carriage optical camera and the under-carriage lidar unit being coupled to said support stage and disposed at a forward end thereof so as to extend under an under-carriage of said electric vehicle when the lift stage and the wheel are engaged; and
wherein said under-carriage optical camera senses a relative position or positions of one or more position markers on the under-carriage of said electric vehicle indicative of a location of a battery module cover plate beneath said electric vehicle; and
wherein said under-carriage lidar unit senses and tracks one or more moving parts of said system so as to position and disengage one or more mechanical fasteners securing said cover plate to the under-carriage of said electric vehicle; and
wherein said one or more moving parts comprising a mobile robot under control of said central controller that are configured and arranged to mechanically disengage said mechanical fasteners securing said cover plate to the under-carriage of said electric vehicle.

22. The system of claim 21, wherein said status signals comprise signals encoding information indicative of any of a height, speed, acceleration, force, reaching a target location, or reaching a maximum displacement of the lift.

23. The system of claim 21, comprising a group of four autonomous lifts, each configured and adapted to engage a respective wheel of a four-wheeled electric vehicle and to raise its respective wheel, wherein two of the four lifts engage two respective forward vehicle wheels and the other two lifts engage two respective rear wheels of said electric vehicle, and wherein only the two lifts at said rear wheels comprise respective under-carriage sensor apparatuses.

24. The system of claim 21, further comprising one or more tilt sensors indicative of a difference in height between some wheels of said electric vehicle and other wheels of said vehicle when the vehicle is raised.

* * * * *